United States Patent
Yoshimura et al.

(10) Patent No.: US 9,481,329 B2
(45) Date of Patent: Nov. 1, 2016

(54) GROMMET AND WIRE HARNESS

(71) Applicant: YAZAKI CORPORATION, Tokyo (JP)

(72) Inventors: Katsuya Yoshimura, Makinohara (JP); Satoshi Yokoyama, Makinohara (JP); Takaaki Yanagihashi, Toyota (JP); Hiroki Kawakami, Okazaki (JP)

(73) Assignee: YAZAKI CORPORATION, Tokyo (JP)

( * ) Notice: Subject to any disclaimer, the term of this patent is extended or adjusted under 35 U.S.C. 154(b) by 16 days.

(21) Appl. No.: 14/687,150

(22) Filed: Apr. 15, 2015

(65) Prior Publication Data
US 2015/0305174 A1    Oct. 22, 2015

(30) Foreign Application Priority Data

| Apr. 16, 2014 | (JP) | 2014-084355 |
| Apr. 16, 2014 | (JP) | 2014-084359 |
| Apr. 16, 2014 | (JP) | 2014-084362 |
| Apr. 16, 2014 | (JP) | 2014-084371 |

(51) Int. Cl.
*H02G 3/18*      (2006.01)
*H01B 17/26*    (2006.01)
*B60R 16/02*    (2006.01)
*H01B 17/58*    (2006.01)
*H02G 3/22*      (2006.01)
*B60J 5/04*        (2006.01)

(52) U.S. Cl.
CPC ......... *B60R 16/0222* (2013.01); *H01B 17/583* (2013.01); *B60J 5/0418* (2013.01); *H02G 3/22* (2013.01); *Y10T 16/05* (2015.01); *Y10T 16/063* (2015.01)

(58) Field of Classification Search
CPC .... B60J 5/0418; Y10T 16/063; Y10T 16/05; B60R 16/0222; B60R 16/0215; H02G 3/22; H01B 17/265
USPC ............. 174/135, 650, 152 G, 153 G; 16/2.1
See application file for complete search history.

(56) References Cited

U.S. PATENT DOCUMENTS

| 6,051,790 | A  * | 4/2000  | Takeuchi | B60R 16/0207 174/70 R |
| 6,278,060 | B1 * | 8/2001  | Mori     | B60R 16/0222 16/2.1 |
| 6,479,748 | B2 * | 11/2002 | Mori     | B60R 16/0222 16/2.1 |
| 7,244,894 | B1 * | 7/2007  | Lipp     | B60R 16/0222 16/2.1 |
| 7,434,814 | B2 * | 10/2008 | Kumakura | F16L 5/10 16/2.1 |
| 7,615,713 | B2 * | 11/2009 | Bardella | B60R 16/0215 16/2.1 |
| 2014/0291939 | A1 | 10/2014 | Furuta et al. | |

FOREIGN PATENT DOCUMENTS

| JP | 2011-024280 A | 2/2011 |
| JP | 2013-132167 A | 7/2013 |

* cited by examiner

*Primary Examiner* — Dimary Lopez Cruz
(74) *Attorney, Agent, or Firm* — Sughrue Mion, PLLC

(57) ABSTRACT

A grommet includes: a grommet body including a lip portion which contacts a water stopped surface defining an accommodation recess portion in a state in which the grommet body is attached to the accommodation recess portion; an outer which presses the lip portion toward the water stopped surface in a state in which the grommet body is sandwiched between the outer and the water stopped surface; and a rigid body portion which is interposed between the outer and the lip portion with respect to a pressing direction of the outer and which has rigidity higher than that of the lip portion. At least a part of the lip portion is placed in a pressed region pressed by the outer.

19 Claims, 16 Drawing Sheets

GROMMET AND WIRE HARNESS

CROSS REFERENCE TO RELATED APPLICATION(S)

This application is based on and claims priority from Japanese Patent Application No. 2014-084355 filed on Apr. 16, 2014, Japanese Patent Application No. 2014-084359 filed on Apr. 16, 2014, Japanese Patent Application No. 2014-084362 filed on Apr. 16, 2014, and Japanese Patent Application No. 2014-084371 filed on Apr. 16, 2014, the entire contents of which are incorporated herein by reference.

BACKGROUND

1. Field of the Invention

One or more embodiments of the present invention relate to a grommet and a wire harness.

2. Description of the Related Art

As an example of the grommet and the wire harness, JP-A-2013-132167, for example, discloses a non-through type grommet that has a protector accommodating a wire harness and a grommet base portion having a protector accommodation portion accommodating the protector and is attached to a grommet accommodation recess portion formed on a door panel of a vehicle. This grommet has a clamp insertion opening, a first water stopping lip and a second water stopping lip on the back surface side of the grommet base portion, and has a clamp engaging with the door panel on the bottom surface of the protector. The grommet protrudes so that the clamp can engage with the door panel from the clamp insertion opening when the protector is accommodated in the protector accommodation portion.

As another example of the grommet and the wire harness, JP-A-2011-024280, for example, discloses a grommet body as a sealing member applied to a wire harness which sealing member is provided with a reinforcing member formed of a metal material and where a through hole for fixing to a counterpart member is formed and a flat portion formed of an elastic material, molded integrally with the reinforcing member and where the reinforcing member is embedded with the through hole being exposed, and holds the gap with a counter part member watertight by coming into contact with the counter part member.

SUMMARY

In the grommet described in JP-A-2013-132167, for example, since the clamp is disposed so as to be situated substantially in the center of the grommet base portion, the pressing force at both ends of the water stopping lip situated in a position relatively away from the clamp tends to be relatively smaller than the pressing force in the central part, and there is room for improvement in water stopping performance in this regard.

For the grommet body described in JP-A-2011-024280, for example, a structure is desired where it can be surely fixed to the counterpart member even if an iron-plate-form reinforcing member molded integrally with the flat portion formed of the elastic material is not provided.

In the grommet described in JP-A-2013-132167, for example, when the shape of the door panel side and the position of engagement by the clamp differ among vehicle models or the like, there is further room for improvement in versatility such that there are cases where the overall shape of the grommet, such as the clamp placement position and the clamp insertion opening position, has be to changed according to the vehicle type.

For the grommet body described in JP-A-2011-024280, for example, it is desired to appropriately deliver water stopping performance even if the iron-plate-form reinforcing member molded integrally with the flat portion formed of the elastic material is not provided.

An object of one aspect of the present invention, which is made in view of the above-mentioned circumstances, is to provide a grommet and a wire harness capable of improving water stopping performance.

An object of another aspect of the present invention, which is made in view of the above-mentioned circumstances, is to provide a grommet and a wire harness capable of being surely fixed.

An object of still another aspect of the present invention, which is made in view of the above-mentioned circumstances, is to provide a grommet and a wire harness capable of improving versatility.

An object of yet another aspect of the present invention, which is made in view of the above-mentioned circumstances, is to provide a grommet and a wire harness capable of appropriately delivering water stopping performance.

In a first aspect of the present invention, there is provided a grommet including: a grommet body formed of an elastic body and including a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface; an outer which presses the lip portion toward the water stopped surface and which fixes the grommet body to the attachment panel in a state in which the grommet body is sandwiched between the outer and the water stopped surface; and a rigid body portion which is formed of a rigid body having rigidity higher than that of the lip portion, and which is interposed between the outer and the lip portion with respect to a pressing direction of the outer, wherein at least a part of the lip portion is placed in a pressed region pressed by the outer.

In a second aspect of the present invention, there is provided the grommet according to the first aspect, wherein the outer includes a pair of fixing portions which sandwich the grommet body with respect to a width direction perpendicular to the pressing direction, and the outer is fixed to the attachment panel through the pair of fixing portions, and wherein the lip portion is placed in an area within the pressed region and between the pair of fixing portions with respect to the width direction.

In a third aspect of the present invention, there is provided the grommet according to the first or second aspect, further including: a protector which is formed of a rigid body having rigidity higher than that of the grommet body, which is accommodated in an accommodation space portion formed in the grommet body in a state in which the electric wire is passed, and which constitutes the rigid body portion, wherein the protector is interposed between the outer and the lip portion with respect to the pressing direction, and forms a layer structure together with the grommet body.

In a fourth aspect of the present invention, there is provided the grommet according to any one of the first to third aspects, wherein the grommet body includes a grommet base portion attachable to the accommodation recess portion in which the electric wire is passed and which is formed on the attachment panel, and wherein the lip portion includes: a first lip portion which is formed to protrude from a water stopping surface of the grommet base portion which opposes the water stopped surface in a state in which the grommet base portion is attached to the accommodation recess portion, wherein an entire part of the first lip portion is placed in the pressed region; and a second lip portion formed to protrude from the water stopping surface, wherein at least a part of the second lip portion is placed in the pressed region and another part of the second lip portion is placed in a placement region of a weather strip provided on the attachment panel across the grommet body.

In a fifth aspect of the present invention, there is provided a wire harness including: an electric wire including a connection portion is provided on an end portion of the electric wire; and a grommet including: a grommet body formed of an elastic body and including a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface; an outer which presses the lip portion toward the water stopped surface and which fixes the grommet body to the attachment panel in a state in which the grommet body is sandwiched between the outer and the water stopped surface; and a rigid body portion which is formed of a rigid body having rigidity higher than that of the lip portion, and which is interposed between the outer and the lip portion with respect to a pressing direction of of the outer, wherein at least a part of the lip portion is placed in a pressed region pressed by the outer.

In a sixth aspect of the present invention, there is provided a grommet including: a grommet body formed of an elastic body and including a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface; a protector which is formed of a rigid body having rigidity higher than that of the grommet body and which is accommodated in an accommodation space portion formed in the grommet body in a state in which the electric wire is passed; and an outer which presses the lip portion toward the water stopped surface and fixes the grommet body to the attachment panel in a state in which the grommet body and the protector are sandwiched between the outer and the water stopped surface, wherein the grommet body includes: a first grommet body side recess portion formed on a side of the accommodation space portion; and a second grommet body side recess portion formed on an outer surface of the grommet body so as to be adjacent to the first grommet body side recess portion, wherein the protector includes a protector side protruding portion fitted in the first grommet body side recess portion in a state in which the protector is accommodated in the accommodation space portion, and wherein the outer includes an outer side protruding portion fitted in the second grommet body side recess portion in a state in which the grommet body is fixed to the attachment panel.

In a seventh aspect of the present invention, there is provided the grommet according to the sixth aspect, wherein the protector side protruding portion is formed along the pressing direction of the outer, wherein the outer side protruding portion is formed along the width direction perpendicular to the pressing direction, and wherein the protector side protruding portion and the outer side protruding portion are adjacent to each other with a part of the grommet body interposed therebetween along the pressing direction and a direction perpendicular to the width direction in a state in which the protector is accommodated in the accommodation space portion and the grommet body is fixed to the attachment panel by the outer.

In an eighth aspect of the present invention, there is provided the grommet according to the sixth or seventh aspect, wherein the outer includes: a body portion which is formed along the width direction perpendicular to the pressing direction and which sandwiches the grommet body and the protector between the outer and the water stopped surface; and a pair of fixing portions which sandwich the grommet body with respect to the width direction and which are provided on both end portions of the body portion with respect to the width direction, wherein the outer side protruding portion is provided on the fixing portion, and wherein the protector side protruding portion and the first grommet body side recess portion are situated between the outer side protruding portion and the body portion in a state in which the grommet body is fixed to the attachment panel by the outer.

In a ninth aspect of the present invention, there is provided the grommet according to any one of the sixth to eighth aspects, wherein the grommet body has an insertion opening which allows the protector to be inserted into the accommodation space portion from one side, and wherein the protector includes a positioning abutment portion which is allowed to abut on an inner part of the accommodation space portion on a side opposite to the insertion opening in a position where the protector side protruding portion is fitted in the first grommet body side recess portion.

In a tenth aspect of the present invention, there is provided a wire harness including: an electric wire including a connection portion is provided on an end portion of the electric wire; and a grommet including: a grommet body formed of an elastic body and including a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface; a protector which is formed of a rigid body having rigidity higher than that of the grommet body and which is accommodated in an accommodation space portion formed in the grommet body in a state in which the electric wire is passed; and an outer which presses the lip portion toward the water stopped surface and fixes the grommet body to the attachment panel in a state in which the grommet body and the protector are sandwiched between the outer and the water stopped surface, wherein the rigid body portion includes a protector which is formed of a rigid body having rigidity higher than that of the grommet body and which is accommodated in an accommodation space portion formed in the grommet body in a state in which the electric wire is passed, wherein the outer presses the lip portion toward the water stopped surface and fixes the grommet body to the attachment panel in a state in which the grommet body and the protector are sandwiched between the outer and the water stopped surface, wherein the grommet body includes: a first grommet body side recess portion formed on a side of the accommodation space portion; and a second grommet body side recess portion formed on an outer surface of the grommet body so as to be adjacent to the first grommet body side recess portion, wherein the protector includes a protector side protruding portion fitted in the first grommet body side recess portion in a state in which the protector is accommodated in the accommodation space portion, and wherein the outer includes an outer side protruding portion fitted in the second grommet body side recess portion in a state in which the grommet body is fixed to the attachment panel.

In a eleventh aspect of the present invention, there is provided a grommet including: a grommet body formed of an elastic body and including a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface; an outer which is structured separately from the grommet body, which presses the lip portion toward the water stopped surface, and which fixes the grommet body to the attachment panel in a state in which the grommet body is sandwiched between the outer and the water stopped surface; and a rigid body portion which is formed of a rigid body having rigidity higher than that of the lip portion, and which is interposed between the outer and the lip portion with respect to a pressing direction of the outer, wherein the outer includes a pair of fixing portions which sandwich the grommet body with respect to the width direction perpendicular to the pressing direction, and the outer is fixed to the attachment panel through the pair of fixing portions.

In a twelfth aspect of the present invention, there is provided the grommet according to the eleventh aspect, wherein the pair of fixing portions are situated outside the lip portion with respect to the width direction in a state in which the grommet body is fixed to the attachment panel by the outer.

In a thirteenth aspect of the present invention, there is provided the grommet according to eleventh or twelfth aspect, wherein at least a part of the lip portion is placed in an area within the pressed region pressed by the outer and between the pair of fixing portions with respect to the width direction.

In a fourteenth aspect of the present invention, there is provided a wire harness including: an electric wire including a connection portion is provided on an end portion of the electric wire; and a grommet including: a grommet body formed of an elastic body and including a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface; an outer which is structured separately from the grommet body, which presses the lip portion toward the water stopped surface, and which fixes the grommet body to the attachment panel in a state in which the grommet body is sandwiched between the outer and the water stopped surface; and a rigid body portion which is formed of a rigid body having rigidity higher than that of the lip portion, and which is interposed between the outer and the lip portion with respect to a pressing direction of the outer, wherein the outer includes a pair of fixing portions which sandwich the grommet body with respect to the width direction perpendicular to the pressing direction, and the outer is fixed to the attachment panel through the pair of fixing portions.

In a fifteenth aspect of the present invention, there is provided a grommet including: a grommet body formed of an elastic body and including a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface; a protector which is formed of a rigid body having rigidity higher than that of the grommet body and which is accommodated in an accommodation space portion formed in the grommet body in a state in which the electric wire is passed; and an outer which presses the lip portion toward the water stopped surface and fixes the grommet body to the attachment panel in a state in which the grommet body and the protector are sandwiched between the outer and the water stopped surface, wherein the protector includes: a protector base portion which forms a base surface of a shape along the water stopped surface; and a protector cover portion which forms a wiring space portion in which the electric wire is passed between the protector cover portion and the protector base portion, and which forms a flat surface on which the weather strip provided on the attachment panel across the grommet body is placed with the grommet body being interposed.

In a sixteenth aspect of the present invention, there is provided the grommet according to the fifteenth aspect, wherein at least the protector cover portion and a part of the protector base portion are interposed between the outer and the lip portion with respect to the pressing direction of the outer such that the protector forms a layer structure together with the grommet body.

In a seventeenth aspect of the present invention, there is provided the grommet according to the fifteenth or sixteenth aspect, wherein the protector includes a reinforcing wall portion interposed between the protector base portion and the protector cover portion with respect to the pressing direction of the outer.

In an eighteenth aspect of the present invention, there is provided the grommet according to seventeenth aspect, wherein the reinforcing wall portion includes: a pair of base portion side wall portions which are provided on the protector base portion and which oppose each other with an interval therebetween with respect to the width direction perpendicular to the pressing direction; and a pair of cover portion side wall portions which are provided on the protector cover portion and which oppose each other with an interval therebetween with respect to the width direction, and wherein the base portion side wall portions contact the respective cover portion side wall portions.

In a nineteenth aspect of the present invention, there is provided a wire harness including: an electric wire including a connection portion is provided on an end portion of the electric wire; and a grommet including: a grommet body formed of an elastic body and including a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface; a protector which is formed of a rigid body having rigidity higher than that of the grommet body and which is accommodated in an accommodation space portion formed in the grommet body in a state in which the electric wire is passed; and an outer which presses the lip portion toward the water stopped surface and fixes the grommet body to the attachment panel in a state in which the grommet body and the protector are sandwiched between the outer and the water stopped surface, wherein the protector includes: a protector base portion which forms a base surface opposing the water stopped surface and having a shape along the water stopped surface; and a protector cover portion which forms a wiring space portion in which the electric wire is passed between the protector cover portion and the protector base portion, and which forms a flat surface on which the weather strip provided on the attachment panel across the grommet body is placed with the grommet body being interposed.

The present invention is not limited to the above-described aspects, but various modifications are possible within the scope of the claims. For example, in the above-described aspects, two or more than two aspects may be combined.

The grommet and the wire harness according to one aspect of the present invention produces the following advantageous effect: For example, since the pressing force can be applied to the lip portion in a comparatively wide area by the lip portion being placed in the pressed region pressed by the outer, water can be surely stopped between the water stopping surface and the water stopped surface by the lip portion pressed against the water stopped surface, so that water stopping performance can be improved.

The grommet and the wire harness according to another aspect of the present invention produces the following advantageous effect: The protector side protruding portion of the protector is fitted in the first grommet body side recess portion of the grommet body from the side of the accommodation space portion, and the outer side protruding portion of the outer is fitted in the second grommet body side recess portion of the grommet body from the side of the outer surface. And in the grommet and the wire harness, since the fitting parts are provided adjacent to each other, the rigidity of the part, where the outer is attached, of the grommet body as an elastic body can be ensured by these fitting parts. As a consequence, in the grommet and the wire harness, the grommet body can be surely fixed to the attachment panel.

The grommet and the wire harness according to still another aspect of the present invention produces the following advantageous effect: The outer has fixing portions provided as a pair so as to sandwich the grommet body with respect to the width direction, and is fixed to the attachment panel through the pair of fixing portions in a state in which the grommet body is sandwiched between the outer and the water stopped surface. Thereby, in the grommet and the wire harness, for example, even when the configuration of the side of the attachment panel differs among vehicle models or the like, by changing the configurations of the fixing portions of the outer or the like structured separately from the grommet body, the grommet body can be appropriately fixed to the attachment panel without the overall configuration of the grommet being changed. As a consequence, in the grommet and the wire harness, versatility can be improved.

The grommet and the wire harness according to yet another aspect of the present invention produces the following advantageous effect: By pressing the lip portion toward the water stopped surface by transmitting the pressing force from the outer to the lip portion through the base surface of the protector base portion while the electric wires are protected by the protector accommodated in the grommet body, water can be appropriately stopped at the gap with the water stopped surface. Further, in the grommet and the wire harness, since the surface where the weather strip provided on the attachment panel and the grommet body abut on each other can be made flat by the flat surface of the protector cover portion, water can be appropriately stopped at the gap with the weather strip. As a consequence, the grommet and the wire harness can appropriately deliver water stopping performance.

DETAILED DESCRIPTION

Hereinafter, an embodiment according to the present invention will be described in detail based on the drawings. The present invention is not limited by this embodiment. Elements in the embodiment described below include elements that are replaceable by and obvious to one of ordinary skill in the art or substantially the same.

Figure 1:
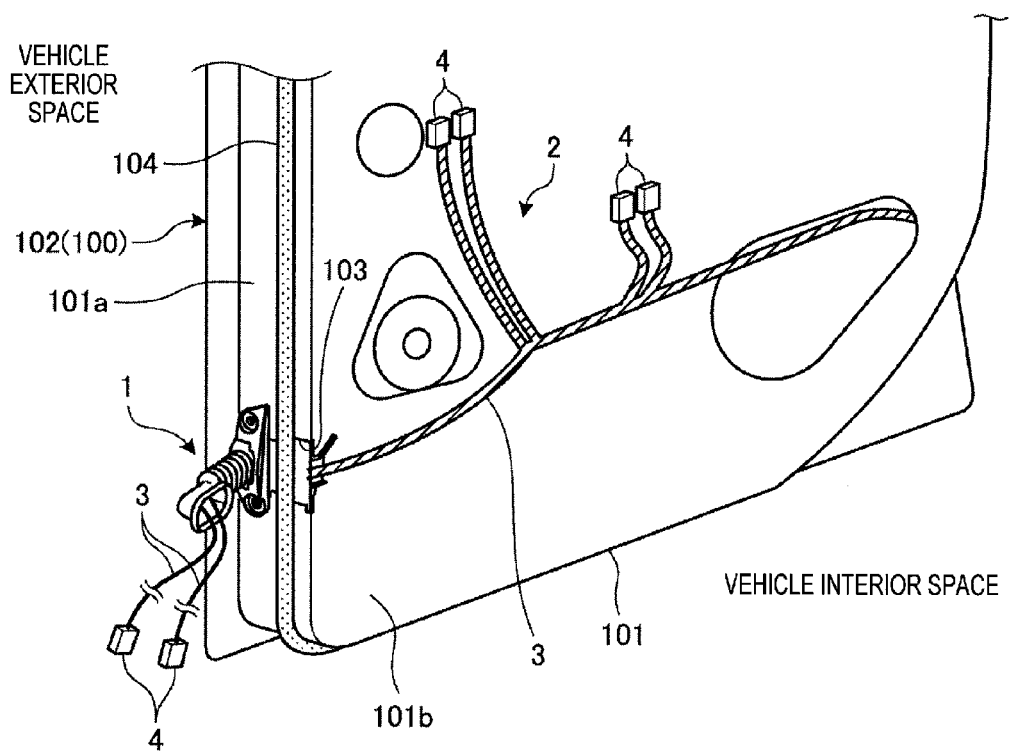
FIG. 1 is a schematic view showing the laying condition of a wire harness to which a grommet according to the embodiment is applied.
Figure 2:
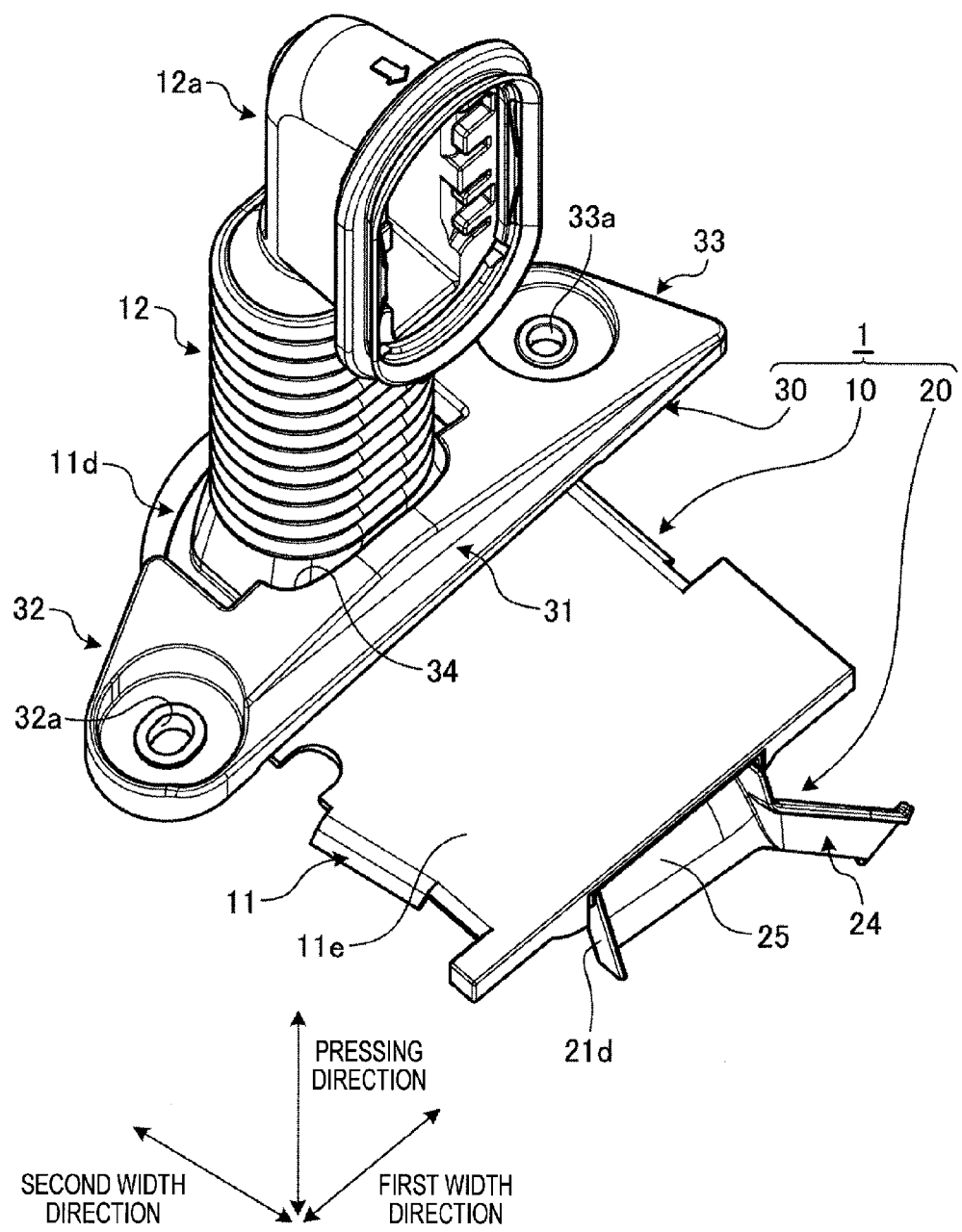
FIG. 2 is a perspective view of the grommet according to the embodiment.
Figure 3:
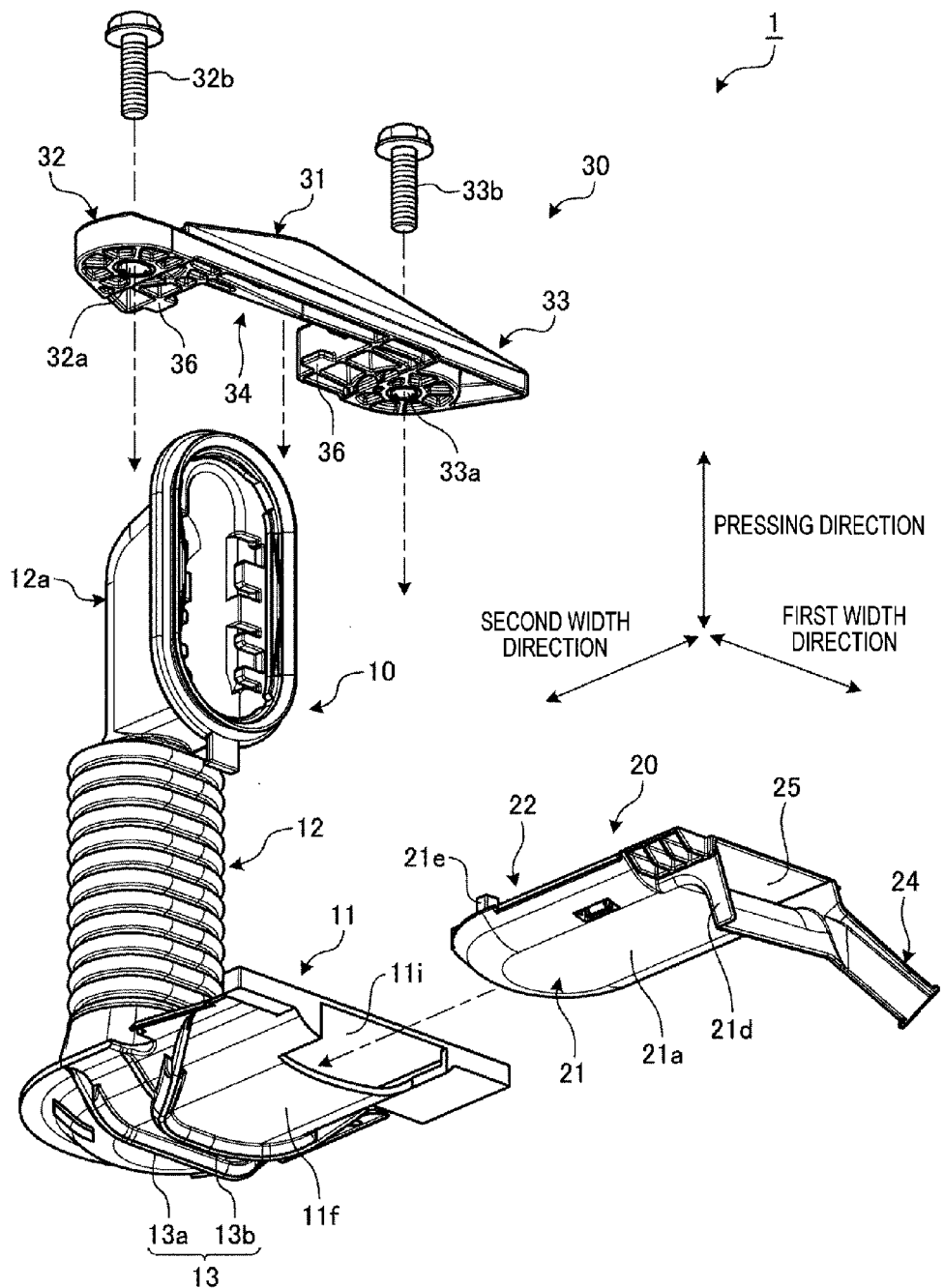
FIG. 3 is an exploded perspective view of the grommet according to the embodiment.
Figure 4:
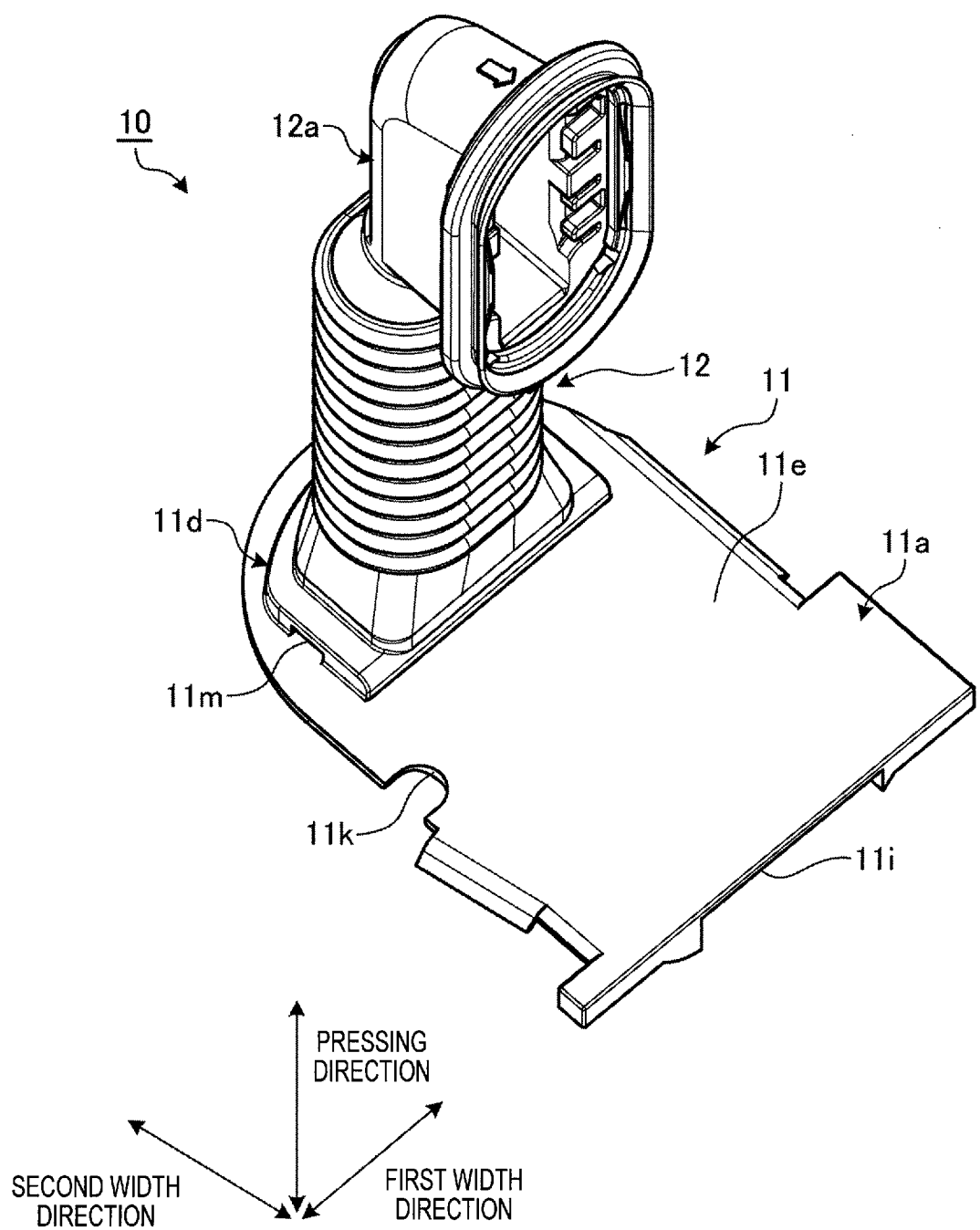
FIG. 4 is a perspective view of a grommet body according to the embodiment.
Figure 5:
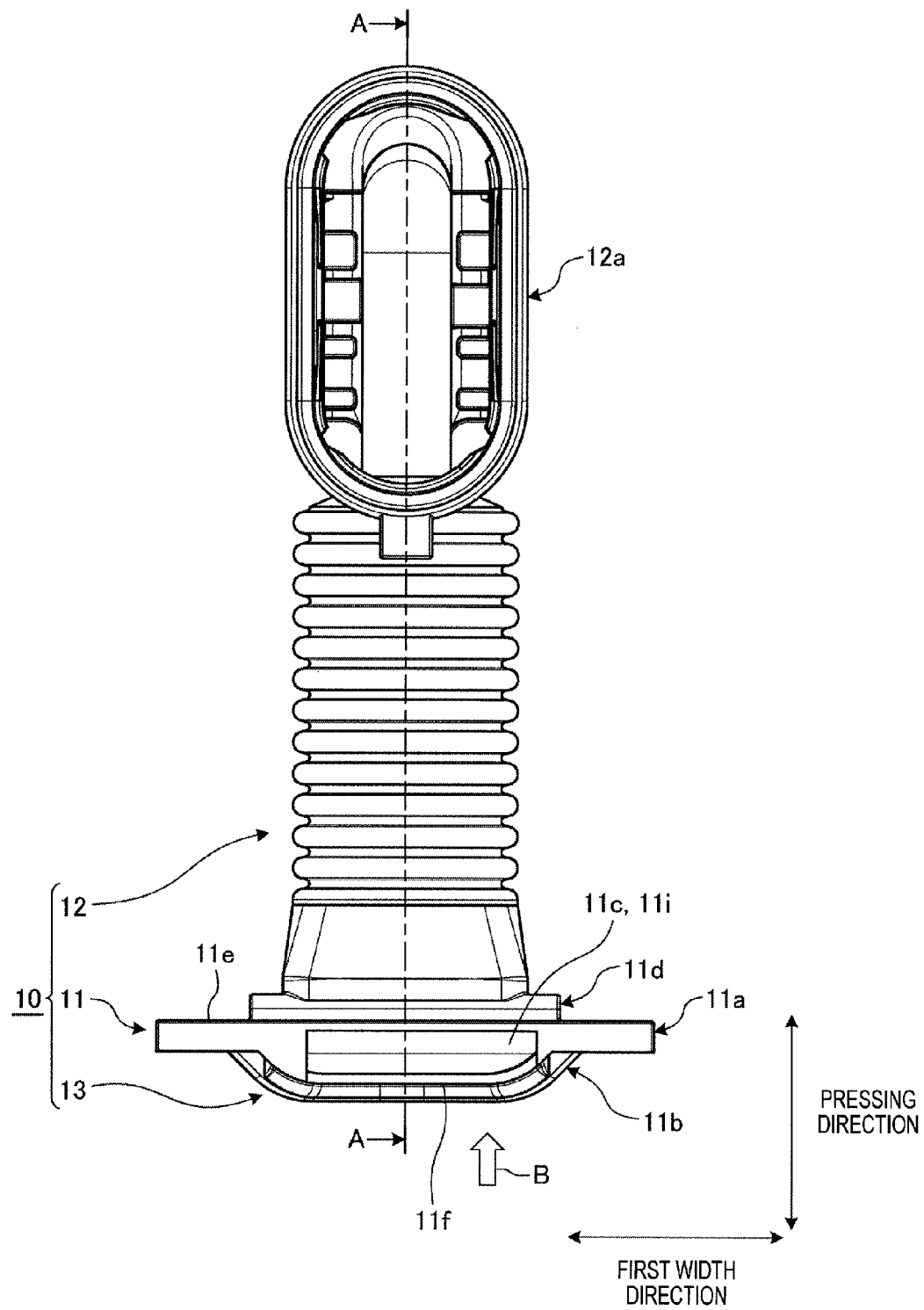
FIG. 5 is a front view, in a second width direction, of the grommet body according to the embodiment.
Figure 6:
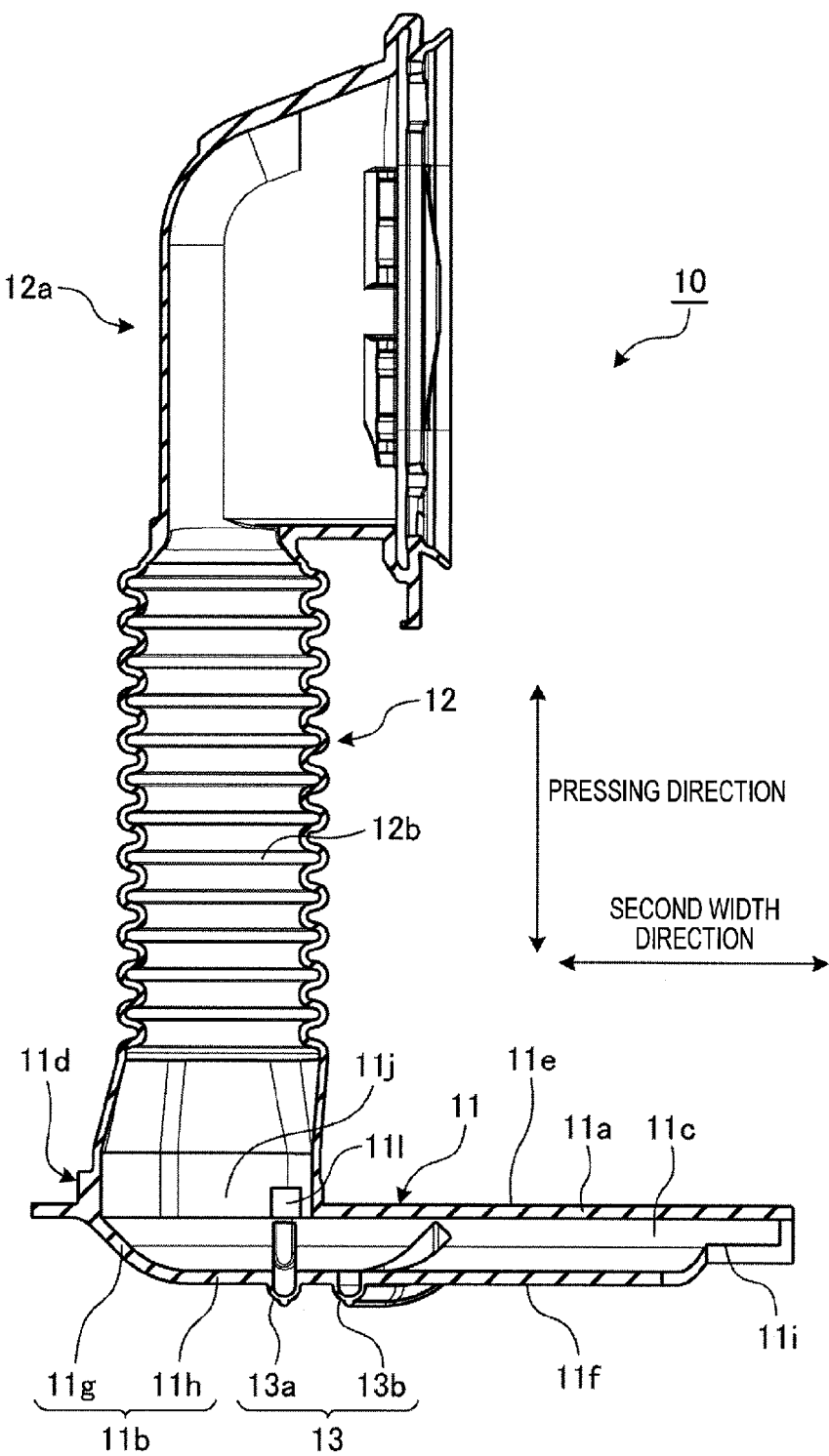
FIG. 6 is a cross-sectional view taken along A-A in FIG. 5.
Figure 7:
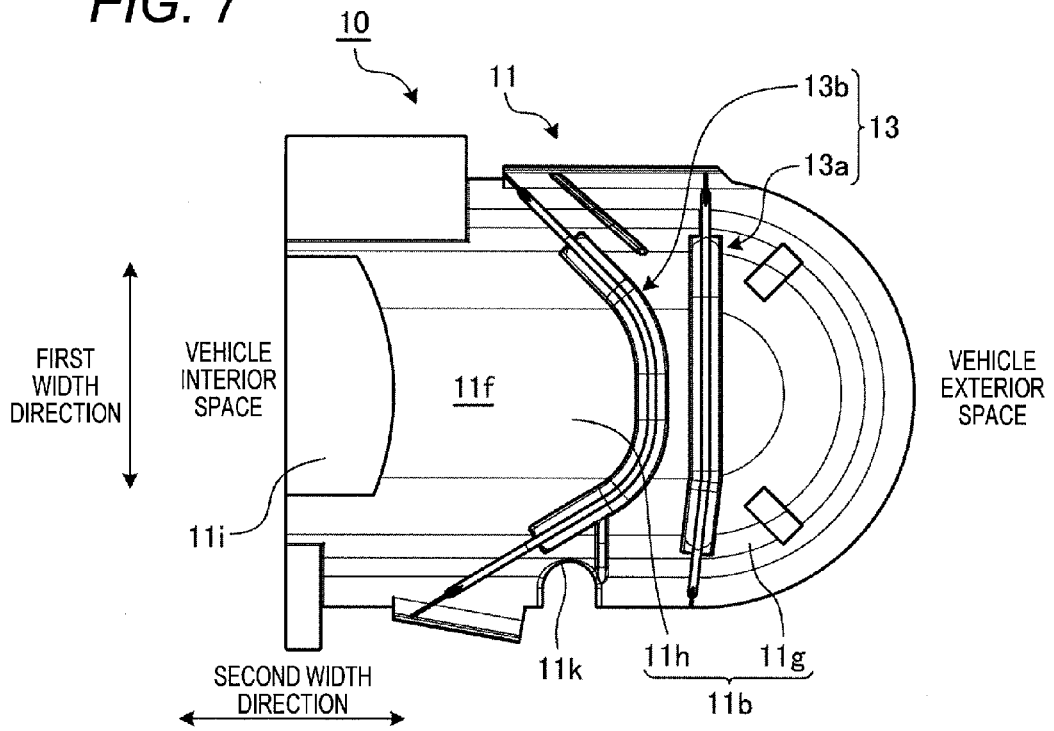
FIG. 7 is a view on arrow B in FIG. 5.
Figure 8:
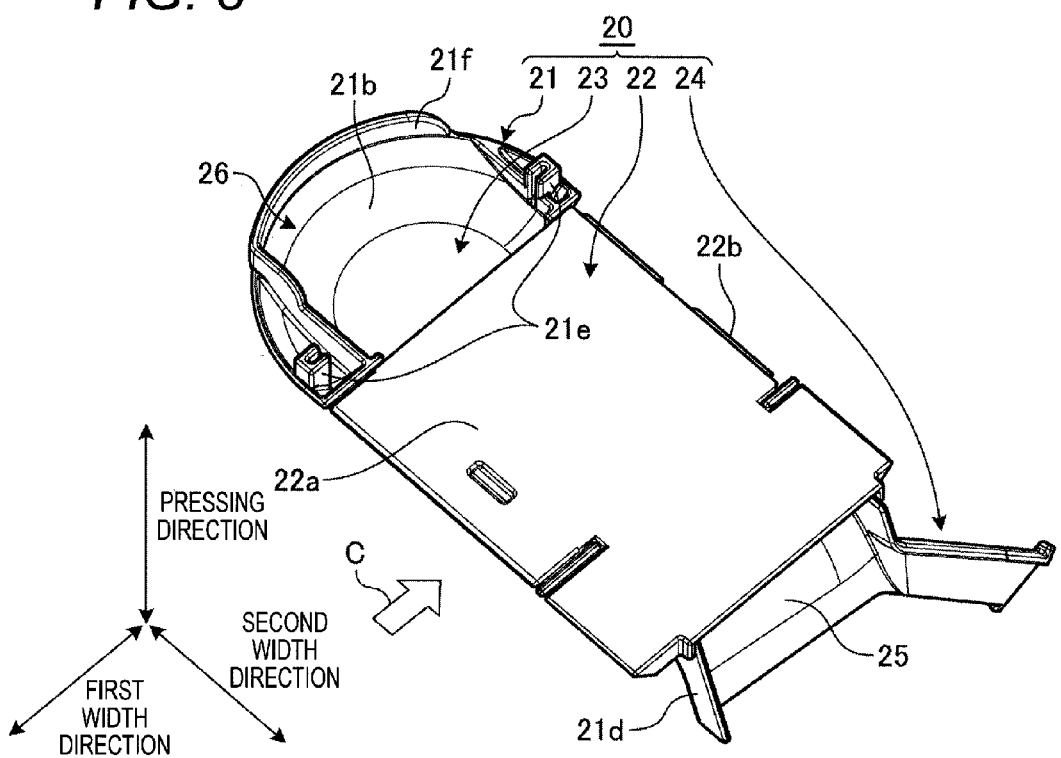
FIG. 8 is a perspective view of a protector according to the embodiment.
Figure 9:
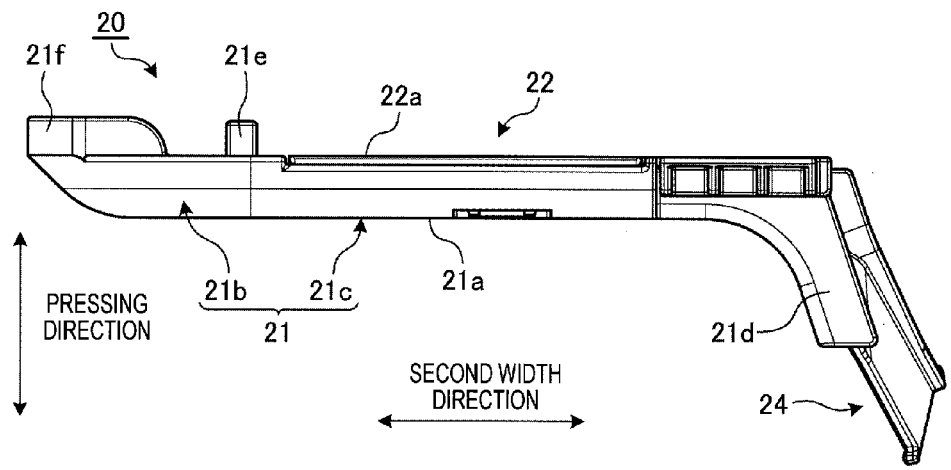
FIG. 9 is a view on arrow C in FIG. 8.
Figure 10:
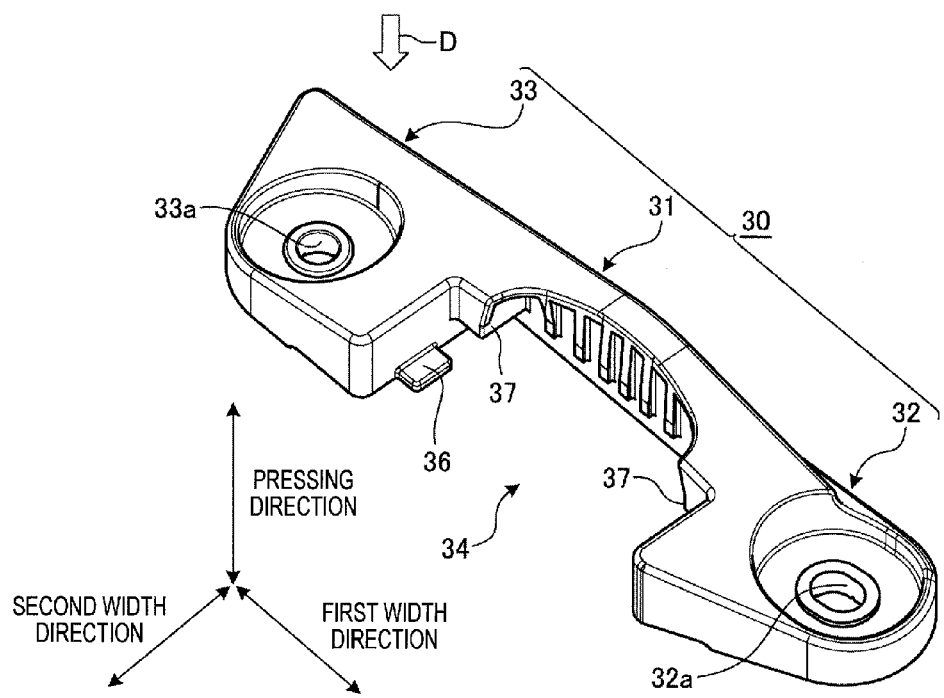
FIG. 10 is a perspective view of an outer according to the embodiment.
Figure 11:
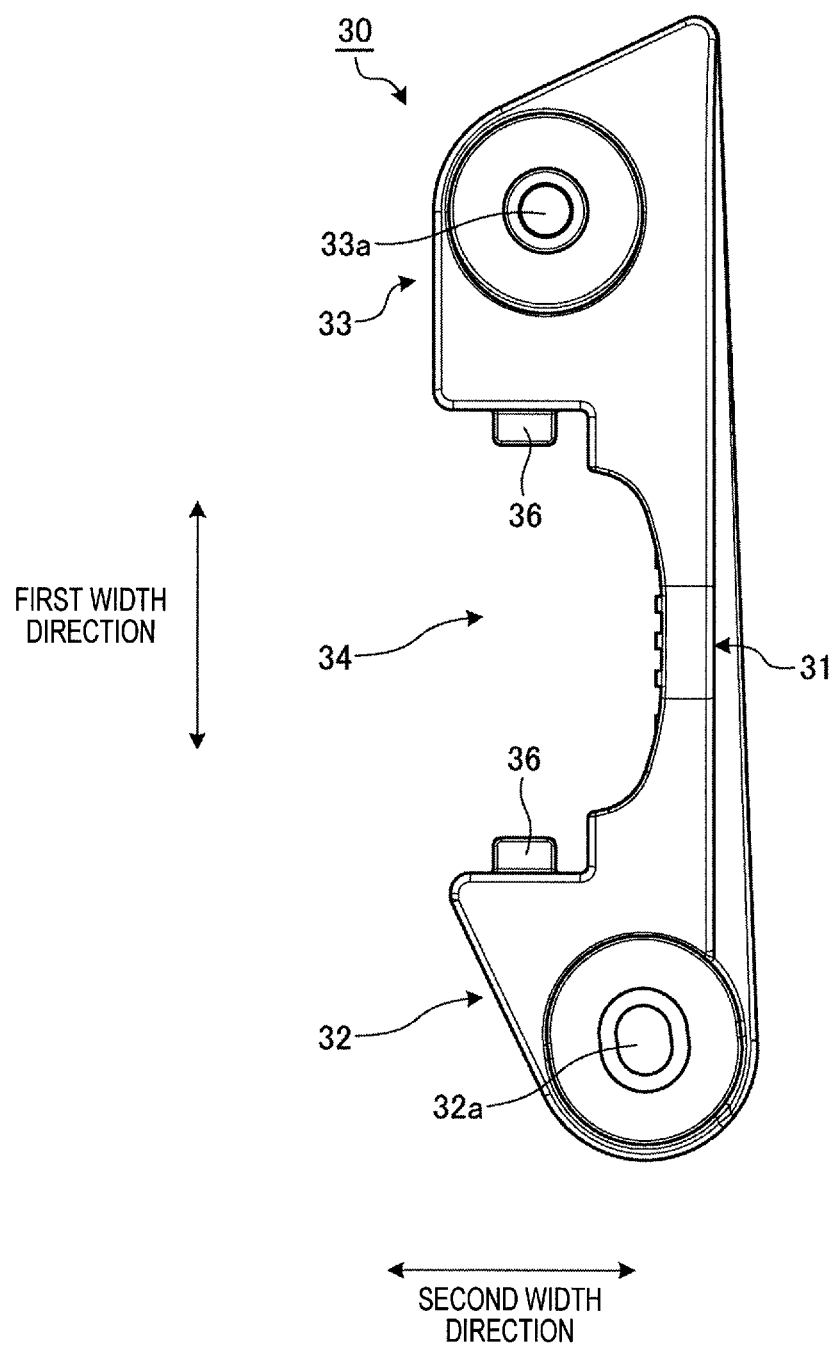
FIG. 11 is a view on arrow D in FIG. 10.
Figure 12:
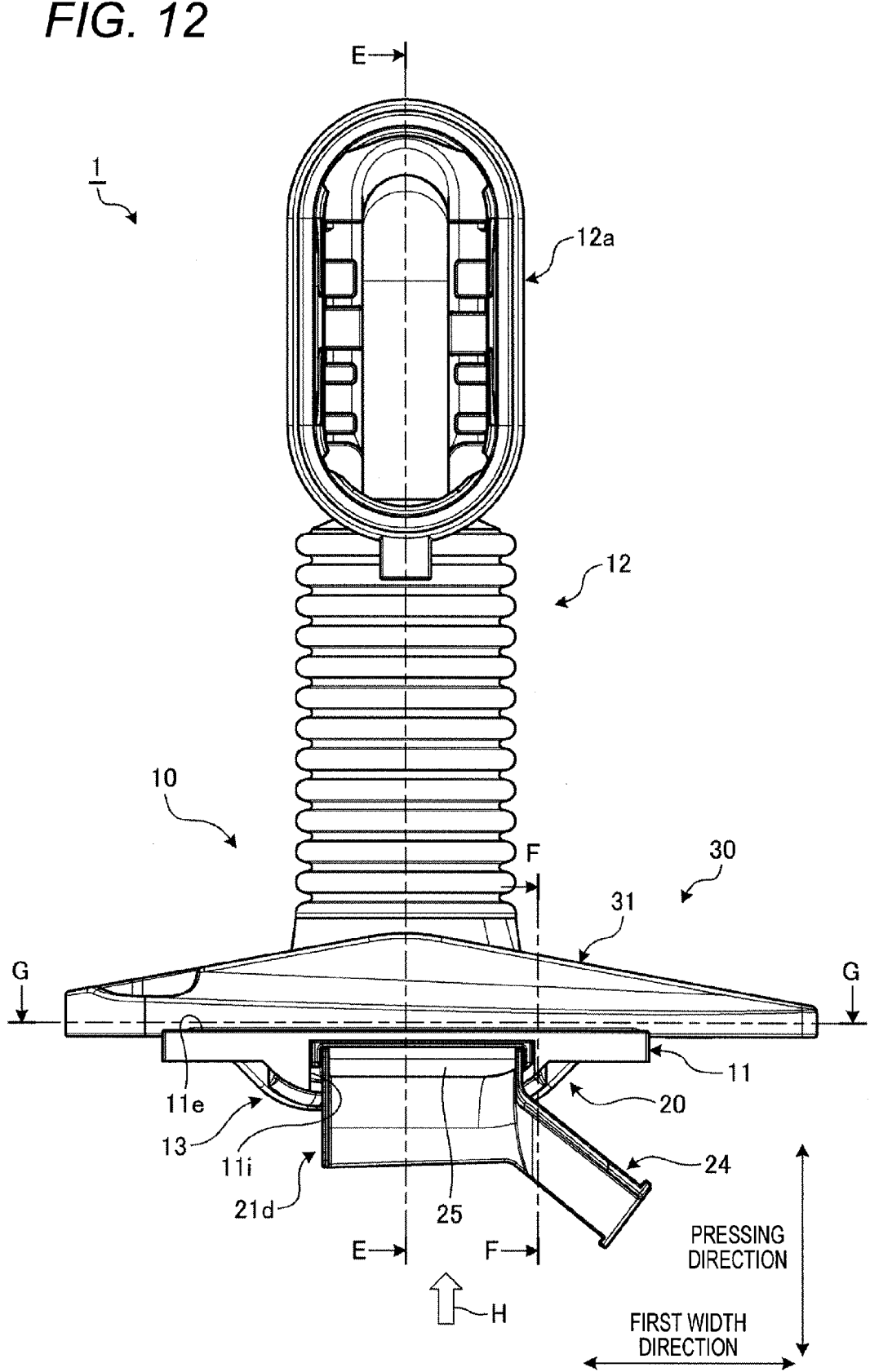
FIG. 12 is a front view, in the second width direction, of the grommet according to the embodiment.
Figure 13:
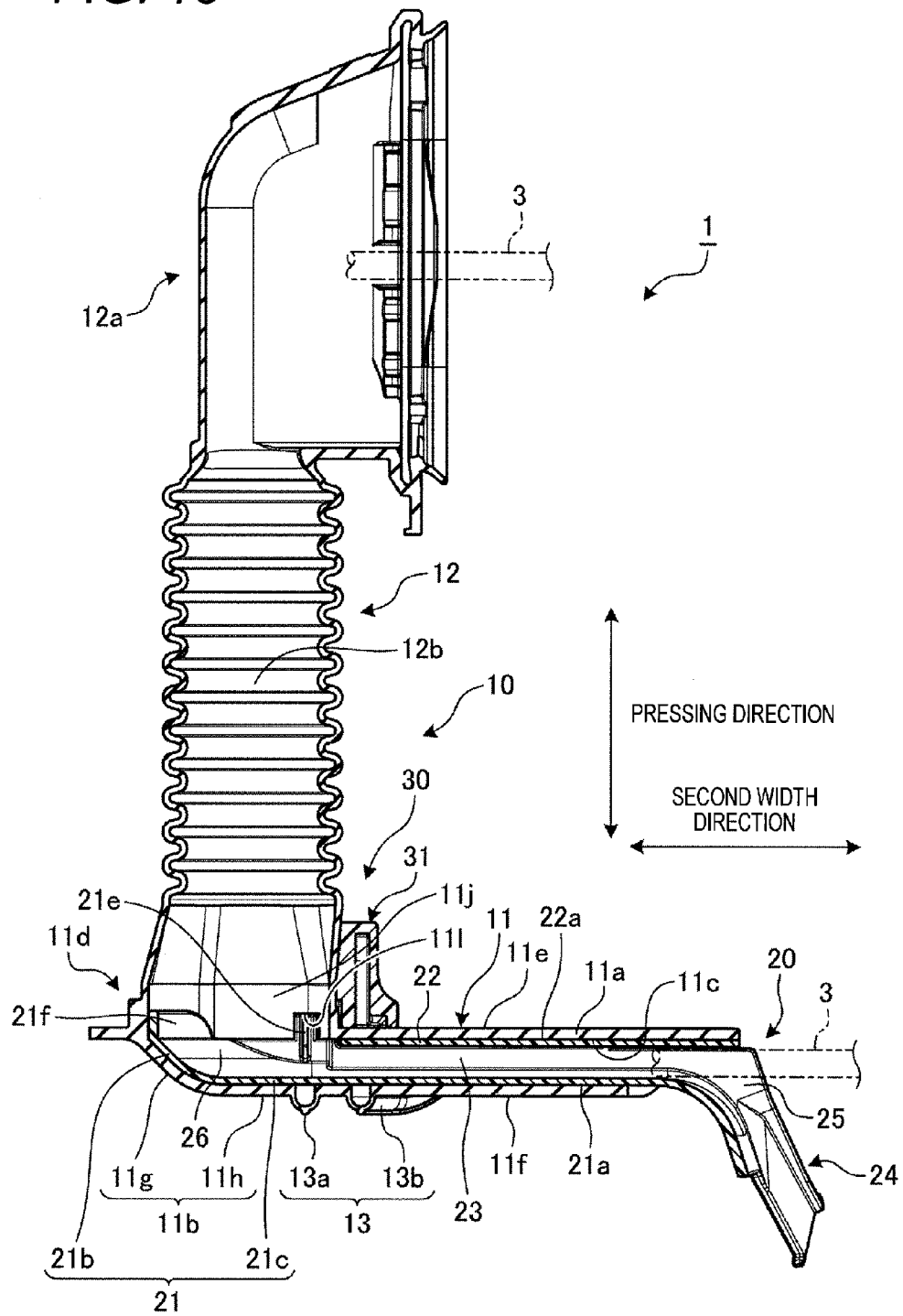
FIG. 13 is a cross-sectional view taken along E-E in FIG. 12.
Figure 14:
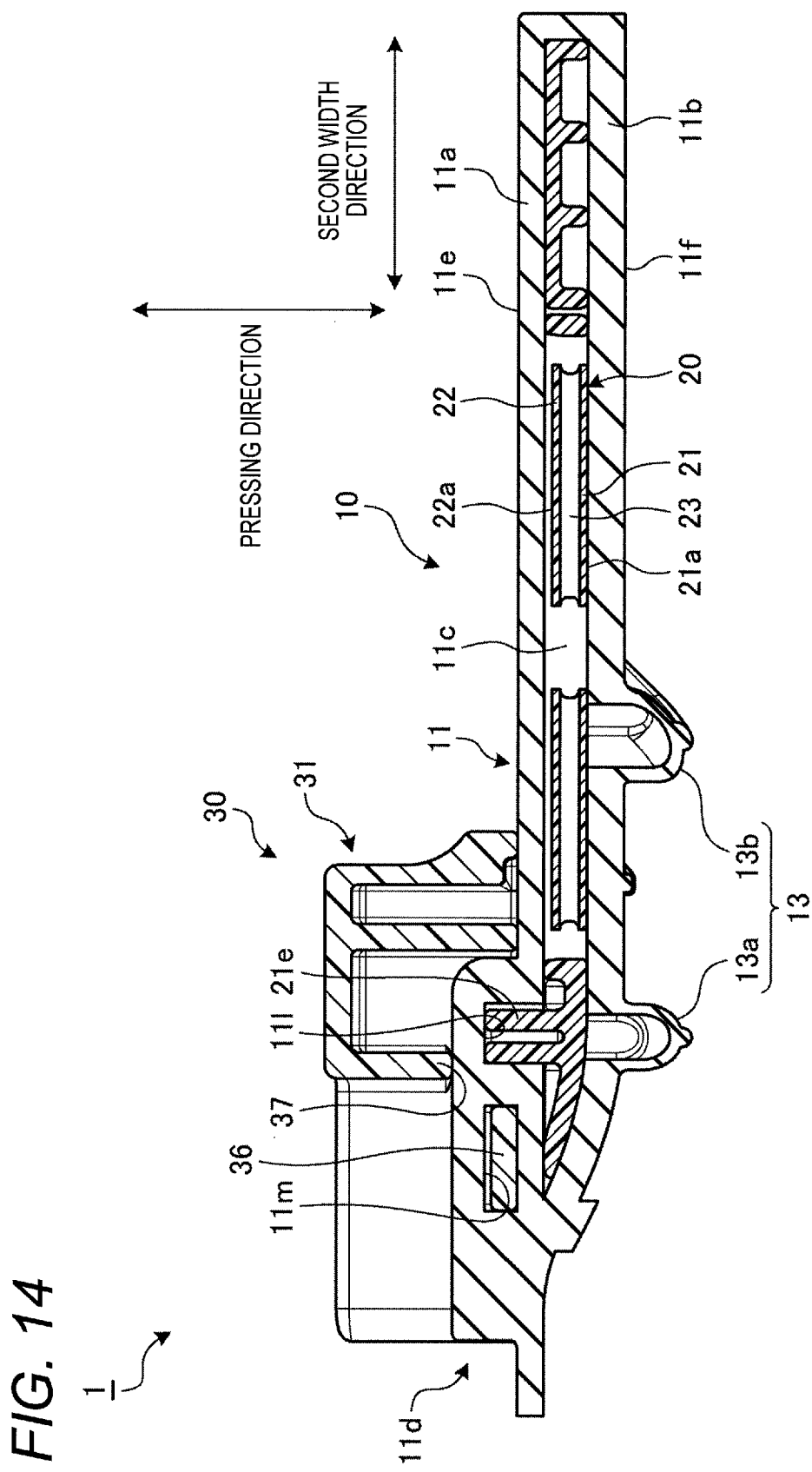
FIG. 14 is a cross-sectional view taken along F-F in FIG. 12.
Figure 15:
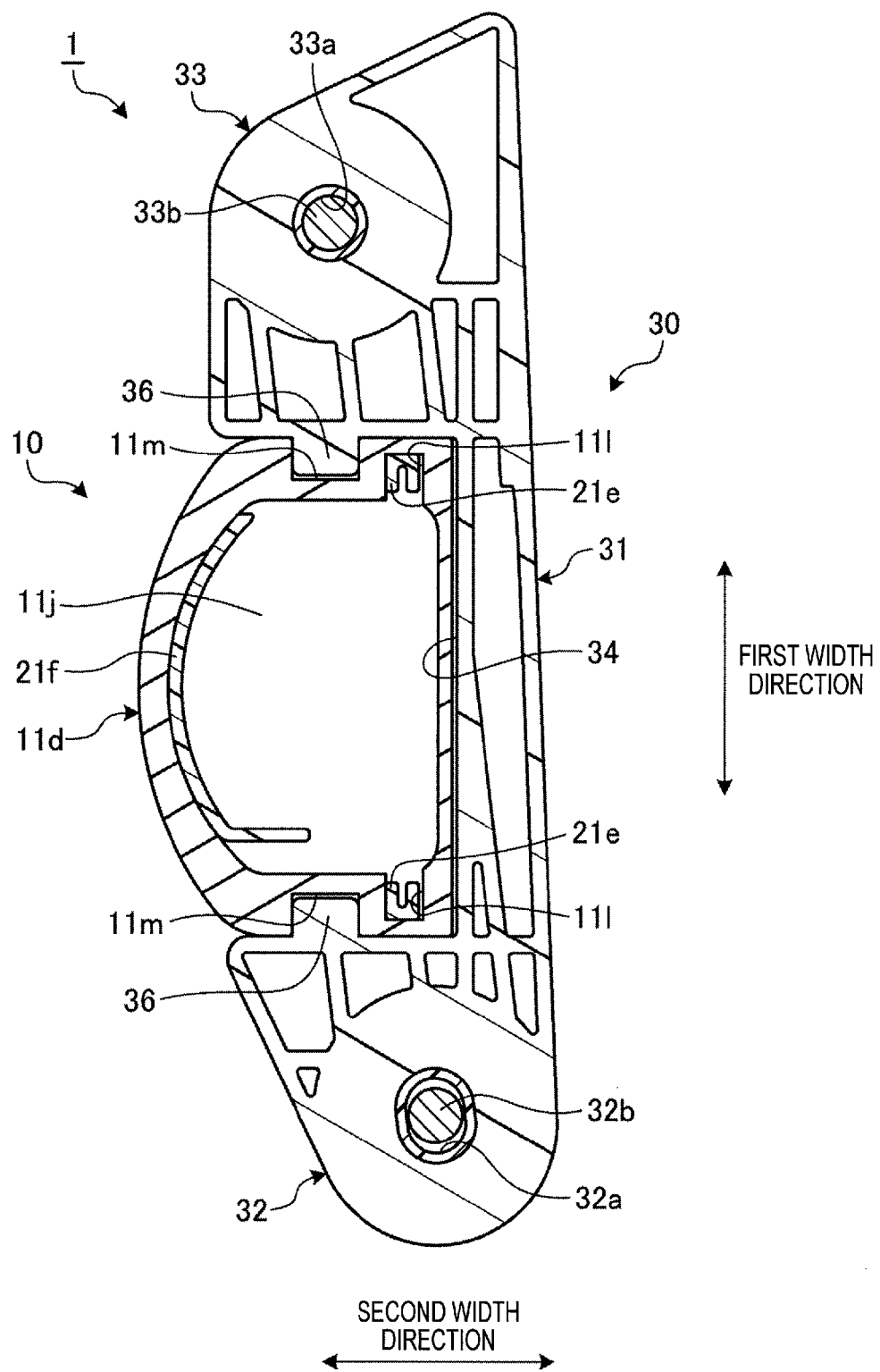
FIG. 15 is a cross-sectional view taken along G-G in FIG. 12.
Figure 16:
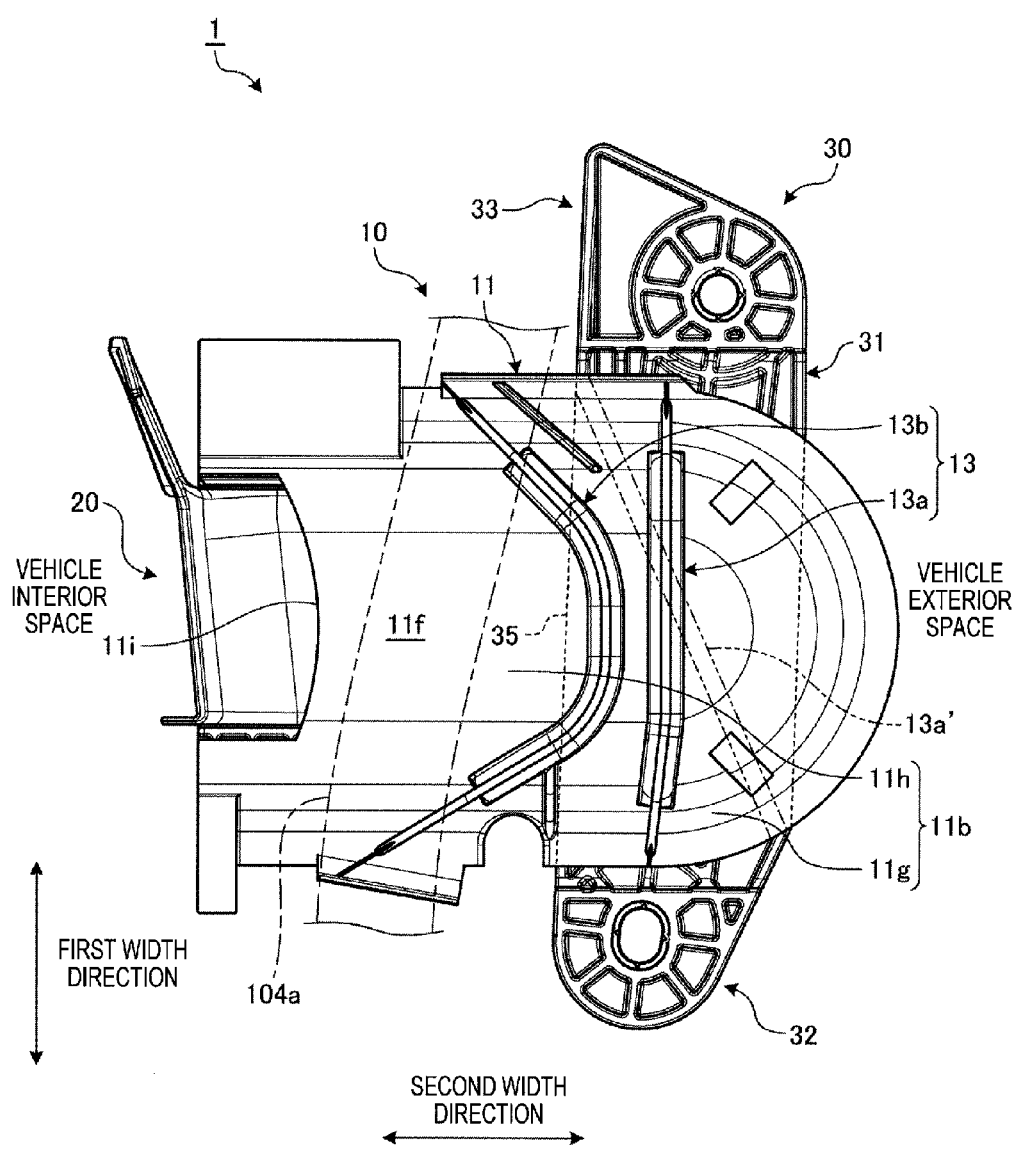
FIG. 16 is a view on arrow H in FIG. 12.
Figure 17:
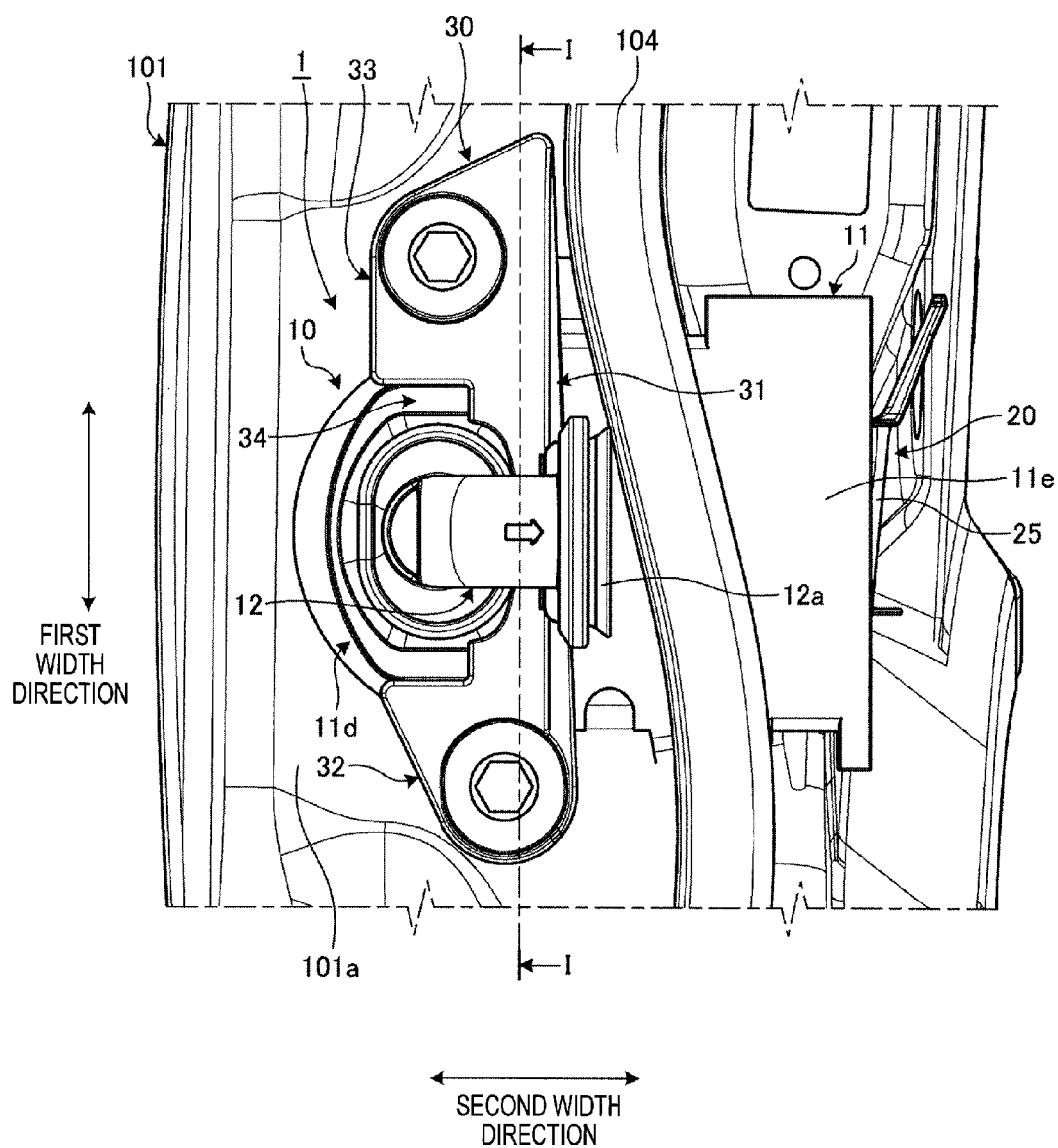
FIG. 17 is a front view in the pressing direction in a state in which the grommet according to the embodiment is set on a door panel.
Figure 18:
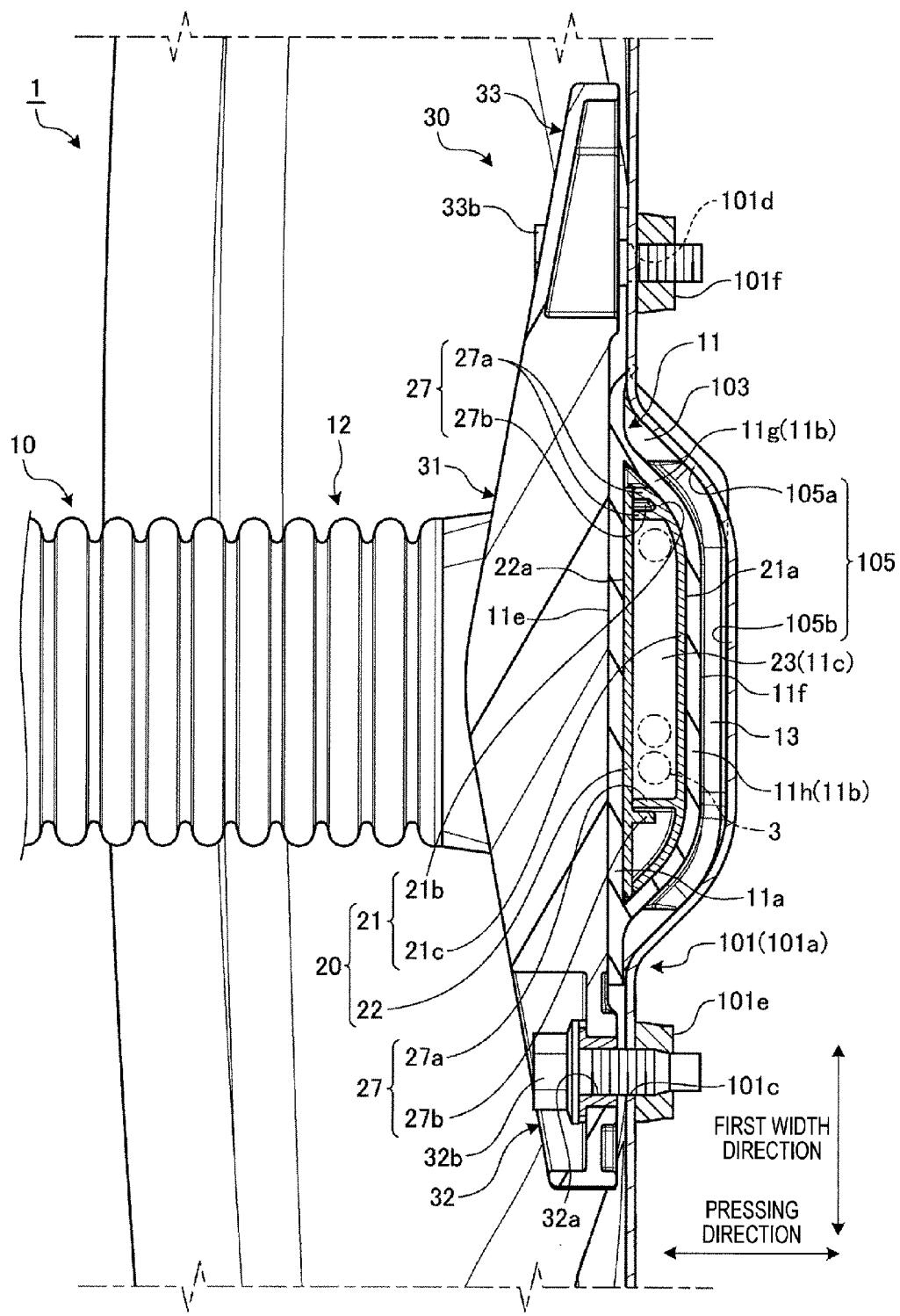
FIG. 18 is a cross-sectional view taken along I-I in FIG. 17.

FIG. 1 is a schematic view showing the laying condition of a wire harness to which a grommet according to the embodiment is applied. FIG. 2 is a perspective view of the grommet according to the embodiment. FIG. 3 is an exploded perspective view of the grommet according to the embodiment. FIG. 4 is a perspective view of a grommet body according to the embodiment. FIG. 5 is a front view, in a second width direction, of the grommet body according to the embodiment. FIG. 6 is a cross-sectional view taken along A-A in FIG. 5 (cross-sectional view along a surface perpendicular to a first width direction). FIG. 7 is a view on arrow B in FIG. 5 (view where a water stopping surface is viewed along a pressing direction). FIG. 8 is a perspective view of a protector according to the embodiment. FIG. 9 is a view on arrow C in FIG. 8 (view viewed along the first width direction). FIG. 10 is a perspective view of an outer according to the embodiment. FIG. 11 is a view on arrow D in FIG. 10 (view viewed along the pressing direction). FIG. 12 is a front view, in the second width direction, of the grommet according to the embodiment. FIG. 13 is a cross-sectional view taken along E-E in FIG. 12 (cross-sectional view along a surface perpendicular to the first width direction). FIG. 14 is a cross-sectional view taken along F-F in FIG. 12 (cross-sectional view along a surface perpendicular to the first width direction). FIG. 15 is a cross-sectional view taken along G-G in FIG. 12 (cross-sectional view along a surface perpendicular to the first width direction). FIG. 16 is a view on arrow H in FIG. 12 (view where the water stopping surface is viewed along the pressing direction). FIG. 17 is a front view in the pressing direction in a state in which the grommet according to the embodiment is set on a door panel. FIG. 18 is a cross-sectional view taken along I-I in FIG. 17 (cross-sectional view along a surface perpendicular to the second width direction).

The grommet 1 of the present embodiment shown in FIG. 1 is applied when a wire harness 2 laid on a vehicle 100 is laid over two spaces separated by a door panel 101 or the like as an attachment panel in the vehicle 100. The grommet 1 is closely attached to the side of the door panel 101 with electric wires 3 of the wire harness 2 being passed, thereby watertightly laying the wire harness 2 on the door panel 101. Here, the door panel 101 is, for example, an inner panel constituting a door 102 of the vehicle 100, and the two spaces separated by the door panel 101 or the like are, for example, a vehicle interior space and a vehicle exterior space. The grommet 1 is for laying the wire harness 2 from the vehicle body of the vehicle 100 to the door 102 pivotably provided on the vehicle body. The wire harness 2 to which the grommet 1 is applied is provided with electric wires 3 where connectors 4 as connection portions are provided on end portions, and the grommet 1. The wire harness 2 is, for example, a member that bundles into an aggregate part a plurality of electric wires 3 used for power supply and signal communication and connects the electric wires 3 to the devices at a time by the connectors 4 for connection between devices mounted on the vehicle 100. For example, some of the connectors 4 of the wire harness 2 are connected to connectors (not shown) of various electronic devices such as a speaker, a switch unit, a door lock unit and a power window motor attached to the door 102, and other connectors 4 are connected to connectors (not shown) of a wire harness on the vehicle body side. The grommet 1 of the present embodiment is a grommet of a so-called non-through type having no through holes through which the electric wires 3 pass on the door panel 101. The grommet 1 is attached to an accommodation recess portion 103 (see also FIG. 18, etc. described later) formed from a hinge side end surface 101a of the door panel 101 of the door 102 (typically, a vehicle front side end surface where the door 102 is hinged to the vehicle body) to a side surface 101b on the vehicle interior space side. On the surface of the grommet 1, a weather strip 104 is laminated. In addition thereto, the wire harness 2 may include various components such as exterior members such as a corrugate tube, a resin tape and a protector, an electrical junction box, and a fixture.

Specifically, the grommet 1 of the present embodiment is provided with, as shown in FIGS. 2 and 3, the grommet body 10, the protector 20 and the outer 30.

In the following description, the direction along the pressing by the outer 30 will be called the pressing direction, one of the two directions perpendicular to the pressing direction will be called the first width direction, and the other will be called the second width direction. These pressing direction, first width direction and second width direction are perpendicular to one another. As shown in FIG. 1, etc., in a state in which the grommet 1 is attached to the accommodation recess portion 103 of the door panel 101, the pressing direction of the grommet 1 corresponds to the vehicle front-back direction in a state in which the door 102 is closed, the first width direction of the grommet 1 corresponds to the vertical direction, and the second width direction of the grommet 1 corresponds to the vehicle width direction in a state in which the door 102 is closed. When the grommet body 10, the protector 20 and the outer 30 are described, unless otherwise specified, these elements will be described by using the directions in a state in which the grommet 1 is attached to the accommodation recess portion 103.

The grommet body 10 is a sealing member that stops water at the gap with the door panel 101 as an attachment panel as shown in FIGS. 2, 3, 4, 5, 6 and 7. The grommet body 10 has a grommet base portion 11, a tubular portion 12 and a lip portion 13, and these are formed of an elastic body in an integrated manner. The grommet body 10 is formed of a flexible elastic material with low rigidity such as rubber or thermoplastic elastomer (for example, ethylene-propylene-diene rubber [EPDM]). In the description of the grommet body 10, FIG. 18 is also referred to as appropriate.

The grommet base portion 11 is a portion which can be attached to the accommodation recess portion 103 and an inside of which the electric wires 3 of the wire harness 2 are passed and that is formed on the door panel 101 (see FIG. 1, etc.).

Here, as described above with reference to FIG. 1, the accommodation recess portion 103 is formed from the hinge side end surface 101a of the door panel 101 to the side surface 101b in the vehicle interior space. More specifically, as shown in FIG. 18, the accommodation recess portion 103 is formed of a recessed portion on the hinge side end surface 101a of the door panel 101. The accommodation recess portion 103 is formed by the hinge side end surface 101a of the door panel 101 being recessed along the pressing direction so that the cross-sectional shape along a surface perpendicular to the second width direction is substantially inverted trapezoidal. The portion that defines the accommodation recess portion 103 on the door panel 101 is a water stopped surface 105 that is water-stopped by the grommet body 10. The water stopped surface 105 includes a slanting wall portion 105a forming the above-mentioned inverted trapezoidal shape and a flat bottom portion 105b. The flat bottom portion 105b is formed in a substantially rectangular shape and constitutes the bottom surface of the accommodation recess portion 103, and the slanting wall portion 105a is formed as a U-shaped tapered surface so as to surround three sides of the flat bottom portion 105b (three sides other than the side situated on the side of the side surface 101b). The grommet body 10 is attached to the hinge side end surface 101a of the door panel 101 in such a way that the grommet base portion 11 closes the accommodation recess portion 103.

Returning to FIGS. 2, 3, 4, 5, 6 and 7, the grommet base portion 11 includes a grommet flat portion 11a, a grommet bulging portion 11b, an accommodation space portion 11c and a tubular portion connection portion 11d, and these are integrated so as to be hollow as a whole. In the grommet base portion 11, the electric wires 3 are passed in the hollow portion (accommodation space portion 11c). In this example, in the grommet base portion 11, the electric wires 3 are passed through the later-described protector 20 accommodated in the accommodation space portion 11c. The grommet base portion 11 is formed so that the outer shape (the shape on a surface perpendicular to the pressing direction) of the grommet flat portion 11a and the grommet bulging portion 11b is substantially similar to that of the above-described accommodation recess portion 103 (see FIG. 18), and has a shape that can be accommodated and attached in the accommodation recess portion 103. Moreover, in the grommet base portion 11, the cross-sectional shape of the grommet flat portion 11a and the grommet bulging portion 11b along a surface perpendicular to the second width direction is formed in a substantially inverted trapezoidal hollow form slightly smaller than the accommodation recess portion 103 (see FIG. 18). In the grommet base portion 11, the grommet bulging portion 11b opposes the water stopped surface 105 with respect to the pressing direction in a state in which the grommet base portion 11 is accommodated in the accommodation recess portion 103 (see FIG. 18).

More specifically, the grommet flat portion 11a is a portion that forms a flat surface 11e where the weather strip 104 (see FIG. 1) is placed. The grommet bulging portion 11b is a portion that forms a water stopping surface 11f of the grommet base portion 11. The water stopping surface 11f is a surface opposing the water stopped surface 105 (see FIG. 18) that defines the accommodation recess portion 103 in a state in which the grommet base portion 11 is attached to the accommodation recess portion 103. In other words, the grommet bulging portion 11b forms the water stopping surface 11f of a shape along the water stopped surface 105. The grommet bulging portion 11b is formed in a shape corresponding to the water stopped surface 105, in other words, a shape along the water stopped surface 105 in a state in which the grommet base portion 11 is attached to the accommodation recess portion 103. The grommet bulging portion 11b includes a slanting wall portion 11g and a flat bottom portion 11h so as to correspond to the slanting wall portion 105a (see FIG. 18) and the flat bottom portion 105b (see FIG. 18) of the water stopped surface 105. The flat bottom portion 11h is formed in a substantially rectangular shape and constitutes the bottom surface of the grommet bulging portion 11b, and the slanting wall portion 11g is formed as a U-shaped tapered surface so as to surround three sides of the flat bottom portion 11h (three sides other than the side situated on the vehicle interior space side when the grommet base portion 11 is attached to the accommodation recess portion 103). The grommet bulging portion 11b has a configuration that is continuous with the grommet flat portion 11a on the side of the slanting wall portion 11g and bulges from the grommet flat portion 11a in the pressing direction by the slanting wall portion 11g and the flat bottom portion 11h, thereby zoning the accommodation space portion 11c inside. In the grommet bulging portion 11b, the slanting wall portion 11g opposes the slanting wall portion 105a and the flat bottom portion 11h opposes the flat bottom portion 105b in a state in which the grommet base portion 11 is attached to the accommodation recess portion 103 (see FIG. 18).

The accommodation space portion 11c is defined by the grommet flat portion 11a and the grommet bulging portion 11b as a hollow wiring space portion where the electric wires 3 can be laid (see FIG. 6, etc.). In this example, the accommodation space portion 11c functions as a space portion accommodating the later-described protector 20, and the electric wires 3 are passed through the protector 20. The accommodation space portion 11c is closed on the side of the slanting wall portion 11g of the grommet bulging portion 11b. On the other hand, in the accommodation space portion 11c, the side of the remaining one side of the flat bottom portion 11h (one side in the second width direction shown in FIG. 6) is open with respect to the second width direction, and this functions as an insertion opening 11i through which the later-described protector 20 is insertable into the accommodation space portion 11c. That is, the grommet base portion 11 of the grommet body 10 has the insertion opening 11i where the later-described protector 20 is insertable into the accommodation space portion 11c from one side. The above-described flat surface 11e is formed by the outer surface of the grommet flat portion 11a, that is, by the surface opposite to the accommodation space portion 11c. The above-described water stopping surface 11f is formed by the outer surface of the grommet bulging portion 11b, that is, by the surface opposite to the accommodation space portion 11c.

On the grommet flat portion 11a, with respect to the second width direction (see FIG. 6, etc.), a connection opening 11j is formed on the side opposite to the side where the insertion opening 11i is formed. The connection opening 11j is open in the pressing direction. The tubular portion connection portion 11d is formed on an edge portion of the connection opening 11j. The tubular portion connection portion 11d is formed as a rising portion protruding from the flat surface 11e of the grommet flat portion 11a along the pressing direction. To the tubular portion connection portion 11d, the tubular portion 12 is connected.

The tubular portion 12 is an accordion tube where the electric wires 3 of the wire harness 2 are passed. To one end of the tubular portion 12, the tubular portion connection portion 11d is integrally connected, and on the other end, a vehicle body side grommet portion 12a connected to the vehicle side is provided. An insertion space portion 12b (see FIG. 6, etc.) inside the tubular portion 12 communicates with the accommodation space portion 11c of the grommet base portion 11 through the connection opening 11j, so that the electric wires 3 can be passed therethrough.

The lip portion 13 contacts the water stopped surface 105 that defines the accommodation recess portion 103 in a state in which the electric wires 3 are passed inside the grommet base portion 11 and the grommet base portion 11 is attached to the accommodation recess portion 103 formed on the door panel 101, thereby being capable of stopping water between the grommet body 10 and the water stopped surface 105. The lip portion 13 is formed so as to protrude from the water stopping surface 11f of the grommet base portion 11, and as shown in FIG. 18, etc., comes into contact with the water stopped surface 105 to thereby stop water between the water stopping surface 11f and the water stopped surface 105 and hold water-tightness.

The lip portion 13 of the present embodiment includes an outside lip portion 13a as a first lip portion and an inside lip portion 13b as a second lip portion (see FIGS. 6 and 7). As shown in FIG. 7, etc., the outside lip portion 13a is formed substantially linearly along the first width direction on the water stopping surface 11f of the grommet base portion 11. The outside lip portion 13a is formed so as to extend from the edge portion on one side to the edge portion on the other side of the water stopping surface 11f in the first width direction while both end portions are provided on both edge portions of the water stopping surface 11f in the first width direction. The inside lip portion 13b is formed on the insertion opening 11i side of the outside lip portion 13a with respect to the second width direction. That is, in the lip portion 13, with respect to the second width direction, the outside lip portion 13a is disposed on the vehicle exterior space side, and the inside lip portion 13b is disposed on the vehicle interior space side. The inside lip portion 13b is formed in a substantially U shape on the water stopping surface 11f. The inside lip portion 13b is formed so as to extend from the edge portion on one side to the edge portion on the other side of the water stopping surface 11f in the first width direction while both end portions are provided on both edge portions of the water stopping surface 11f in the first width direction and the central portion in the first width direction is bent so as to protrude toward the outside lip portion 13a. The outside lip portion 13a typically functions as a water stopping line that directs a large water flow trying to enter the vehicle interior space side from the vehicle exterior space side, to the vehicle exterior space side. The inside lip portion 13b typically functions as a final water stopping line for the vehicle interior space in the grommet body 10. The outside lip portion 13a and the inside lip portion 13b of the present embodiment are both formed, as shown in FIG. 6, etc., so as to be hollow while the shape of the cross section along a surface perpendicular to the first width direction is substantially triangular. The position of placement of the lip portion 13 will be described later in detail.

In the above-described grommet base portion 11, a drainage hole 11k for drainage (see FIGS. 4 and 7, etc.) is formed in a part which is the lower side in the vertical direction (one side in the first width direction) on the grommet flat portion 11a in a state in which the grommet body 10 is attached to the accommodation recess portion 103. The drainage hole 11k is situated between the outside lip portion 13a and the inside lip portion 13b with respect to the second width direction.

The protector 20 is, as shown in FIGS. 2, 3, 8 and 9, a protective member that is accommodated in the accommodation space portion 11c formed inside the grommet base portion 11 of the grommet body 10 in a state in which the electric wires 3 are passed, and protects the electric wires 3. The protector 20 has a protector base portion 21, a protector cover portion 22, a wiring space portion 23 and a bundle portion 24, and these are formed, in an integrated manner, as a rigid body having rigidity higher than that of the grommet body 10. The protector 20 is formed of, for example, a synthetic resin material such as polypropylene (PP) having rigidity higher than that of the grommet body 10. In the description of the protector 20, FIGS. 13 and 18, etc. will also be referred to as appropriate.

The protector 20 is formed so as to be hollow as a whole by the protector base portion 21 and the protector cover portion 22 being integrated with each other, and the electric wires 3 are passed in the hollow portion (the wiring space portion 23 [see FIGS. 13 and 18, etc.]). The protector 20 is formed so that the outer shape of the protector base portion 21 and the protector cover portion 22 (the shape on a surface perpendicular to the pressing direction) is substantially similar to that of the above-described accommodation space portion 11c, and has a shape that can be inserted and accommodated in the accommodation space portion 11c. Moreover, in the protector 20, the cross-sectional shape, along a surface perpendicular to the second width direction, of the protector base portion 21 and the protector cover portion 22 is formed in a substantially inverted trapezoidal hollow form slightly smaller than the accommodation recess portion 103, specifically, formed in a substantially inverted trapezoidal hollow form slightly smaller than the grommet flat portion 11a and the grommet bulging portion 11b (see FIG. 18). In the protector 20, the protector base portion 21 opposes and contacts the grommet bulging portion 11b and the protector cover portion 22 opposes and contacts the grommet flat portion 11a (see FIG. 18) in a state in which the protector 20 is accommodated in the accommodation space portion 11c.

More specifically, the protector base portion 21 is a container-like member that forms a base surface 21a of a shape along the water stopped surface 105 (see FIG. 18) in a state in which the protector 20 is accommodated in the accommodation space portion 11c and the grommet base portion 11 is attached to the accommodation recess portion 103. The protector base portion 21 of the present embodiment has a shape along the grommet bulging portion 11b. The protector base portion 21 is formed in a shape corresponding to the water stopped surface 105 and the grommet bulging portion 11b, in other words, in a shape along the water stopped surface 105 and the grommet bulging portion 11b. The protector base portion 21 includes, as shown in FIG. 18, etc., a slanting wall portion 21b and a flat bottom portion 21c so as to correspond to the slanting wall portion 105a and the slanting wall portion 11g, and the flat bottom portion 105b and the flat bottom portion 11h. The flat bottom portion 21c is formed in a substantially rectangular shape and constitutes the bottom surface of the protector base portion 21, and the slanting wall portion 21b is formed as a U-shaped tapered surface so as to surround three sides of the flat bottom portion 21c (three sides other than the side situated on the vehicle interior space side when the grommet base portion 11 is attached to the accommodation recess portion 103). In the protector base portion 21, the surface opposite to the flat bottom portion 21c is an open surface. In the protector base portion 21, the slanting wall portion 21b opposes and contacts the slanting wall portion 11g and the flat bottom portion 21c opposes and contacts the flat bottom portion 11h in a state in which the protector 20 is accommodated in the accommodation space portion 11c (see FIG. 13, etc.).

The protector cover portion 22 is a lid-like portion that forms a flat surface 22a where the weather strip 104 is placed through the grommet flat portion 11a (see FIG. 18, etc.). The protector cover portion 22 forms the wiring space portion 23 where the electric wires 3 are passed between it and the protector base portion 21 and forms the flat surface 22a. The flat surface 22a is a surface where the weather strip 104 provided on the door panel 101 across the grommet body 10 is placed with the grommet flat portion 11a of the grommet body 10 being interposed. The protector cover portion 22 is formed in a plate form, and one side thereof is integrally connected to the protector base portion 21 through a hinge portion 22b and the like. Thereby, the protector cover portion 22 can be opened and closed so as to cover the open surface of the protector base portion 21, and defines the wiring space portion 23 between it and the protector base portion 21 by being closed.

The wiring space portion 23 is defined by the protector base portion 21 and the protector cover portion 22 as a hollow wiring space portion where the electric wires 3 can be laid (see FIG. 18, etc.). As shown in FIG. 8, etc., the side of the wiring space portion 23 opposite to the slanting wall portion 21b of the protector base portion 21 is open with respect to the second width direction, and the opening functions as an insertion opening 25 where the electric wires 3 are insertable into the wiring space portion 23. The end portion of the protector base portion 21 opposite to the slanting wall portion 21b is bent toward the side away from the protector cover portion 22 along the pressing direction to constitute a bent portion 21d. The insertion opening 25 is formed as a gap between the bent portion 21d of the protector base portion 21 and the protector cover portion 22.

Thereby, the protector 20 has a structure where the electric wires 3 are insertable into the wiring space portion 23 through the insertion opening 25. The side of the wiring space portion 23 on the side of the protector base portion 21*b* of the protector base portion 21, that is, the side of the wiring space portion 23 opposite to the insertion opening 25 is open to the side of the protector cover portion 22 with respect to the pressing direction, and the opening functions as an insertion opening 26 where the electric wires 3 can be passed. The protector cover portion 22 does not cover the entire part of the open surface of the protector base portion 21 but an opening is left on the side of the slanting wall portion 21*b* of the protector base portion 21, and the opening is the insertion opening 26. The insertion opening 26 is formed in a position opposing the insertion opening 11*i* of the grommet body 10 with respect to the pressing direction in a state in which the protector 20 is inserted and accommodated in the accommodation space portion 11*c* of the grommet body 10 (see FIG. 13). Thereby, in the protector 20, the electric wires 3 can be passed through the insertion opening 26 and the insertion opening 11*i* between the side of the wiring space portion 23 and the side of the insertion space portion 12*b* inside the tubular portion 12. The above-mentioned base surface 21*a* is formed of the outer surface of the protector base portion 21, that is, of the surface opposite to the wiring space portion 23. The above-mentioned flat surface 22*a* is formed of the outer surface of the protector cover portion 22, that is, of the surface opposite to the wiring space portion 23.

Moreover, the protector 20 has, as shown in FIG. 18, a reinforcing wall portion 27 interposed between the protector base portion 21 and the protector cover portion 22 with respect to the pressing direction. In the present embodiment, the reinforcing wall portion 27 is provided more than one in number. The reinforcing wall portions 27 each include a base portion side wall portion 27*a* provided on the protector base portion 21 and a cover portion side wall portion 27*b* provided on the protector cover portion 22. The base portion side wall portion 27*a* and the cover portion side wall portion 27*b* are provided on both edge portions of the protector base portion 21 and the protector cover portion 22 with respect to the first width direction, respectively. The base portion side wall portion 27*a* and the cover portion side wall portion 27*b* are provided so as to rise along the pressing direction from the protector base portion 21 and the protector cover portion 22, respectively, and extend along the second width direction. Thereby, the strength of the protector 20 in the pressing direction is improved.

More specifically, the reinforcing wall portions 27 include, as shown in FIG. 18, a pair of base portion side wall portions 27*a* provided on the protector base portion 21 and opposing each other with an interval therebetween with respect to the first width direction perpendicular to the pressing direction and a pair of cover portion side wall portions 27*b* provided on the protector cover portion 22 and opposing each other with an interval therebetween with respect to the first width direction. The pair of base portion side wall portions 27*a* and the pair of cover portion side wall portions 27*b* are arranged such that the base portion side wall portions 27*a* contact the respective cover portion side wall portions 27*b*. In this example, the reinforcing wall portion 27 further includes another base portion side wall portion 27*a* on one side in the first width direction (in FIG. 18, the side which is the upper side from the viewer's side and the side where the above-mentioned hinge portion 22*b* [see FIG. 8] is provided). On one side of the reinforcing wall portion 27 in the first width direction, the first base portion side wall portion 27*a*, the cover portion side wall portions 27*b* and the second base portion side wall portion 27*a* are arranged in this order from the outside toward the inside in the first width direction and contact one another. On the other hand, on the other side of the reinforcing wall portion 27 in the first width direction, the cover portion side wall portions 27*b* and the base portion side wall portions 27*a* are arranged in this order from the outside toward the inside in the first width direction and contact one another.

Returning to FIGS. 2, 3, 8 and 9, the bundle portion 24 is a portion that bundles the electric wires 3 passed in the wiring space portion 23 with a bundling band or the like and fixes them. The bundle portion 24 is formed so as to protrude from the bent portion 21*d* of the protector base portion 21.

The outer 30 is, as shown in FIGS. 2, 3, 10 and 11, a fixing member structured separately from the grommet body 10 in order to fix the grommet body 10 to the door panel 101. The outer 30 has a body portion 31 and a pair of fixing portions 32 and 33 and these are formed, in an integrated manner, as a rigid body having rigidity higher than that of the grommet body 10. The outer 30 is formed of, for example, a synthetic resin material such as polypropylene (PP) having rigidity higher than that of the grommet body 10. In the description of the outer 30, FIG. 18 will also be referred to as appropriate.

The outer 30 presses the lip portion 13 of the grommet body 10 toward the water stopped surface 105 and fixes the grommet body 10 to the door panel 101 in a state in which the grommet base portion 11 of the grommet body 10 and the protector 20 are sandwiched between the outer 30 and the water stopped surface 105.

More specifically, the body portion 31 is a portion formed along the first width direction and sandwiching the grommet body 10 and the protector 20 between it and the water stopped surface 105 in a state in which the outer 30 fixes the grommet body 10 to the door panel 101 (see FIG. 18, etc.). The body portion 31 is formed in a joist form along the first width direction, and a predetermined part thereof is reinforced by a rib or the like. The fixing portions 32 and 33 are provided as a pair so that they are situated so as to sandwich the grommet base portion 11 of the grommet body 10 with respect to the first width direction in a state in which the outer 30 fixes the grommet body 10 to the door panel 101. The fixing portions 32 and 33 are provided on both end portions of the body portion 31 with respect to the first width direction. More specifically, the fixing portions 32 and 33 are formed so as to protrude from both end portions of the body portion 31 toward one side in the second width direction, and forms a fitting space portion 34 in a gap with the body portion 31 by protruding. The fitting space portion 34 is a space portion three sides of which are surrounded by the body portion 31 and the pair of fixing portions 32 and 33. In a state in which the outer 30 fixes the grommet body 10 to the door panel 101, the tubular portion connection portion 11*d* of the grommet base portion 11 and a part of the tubular portion 12 are fitted in the fitting space portion 34 from the side of the flat surface 11*e* of the grommet base portion 11 (see FIG. 15, etc.). In this state, the outer 30 is in a positional relationship such that the pair of fixing portions 32 and 33 sandwich the tubular portion connection portion 11*d* and the like with respect to the first width direction. Then, the outer 30 is fixed to the door panel 101 through the pair of fixing portions 32 and 33. On the fixing portions 32 and 33 of the present embodiment, bolt holes 32*a* and 33*a* for bolting are formed, respectively. Fastening bolts 32*b* and 33*b* are inserted into the bolt holes 32*a* and 33*a* and inserted into bolt holes 101*c* and 101*d* formed on the hinge side end surface 101a of the door panel 101, respectively, and the tips thereof are screwed to fastening nuts 101e and 101f, whereby the outer 30 is fixed to the hinge side end surface 101a by the bolting (see FIG. 18).

The grommet body 10, the protector 20 and the outer 30 structured as described above are assembled to one another as shown in FIGS. 1, 2, 12, 13, 14, 15 and 16, thereby constituting the grommet 1 as a whole. That is, in the grommet 1, the protector 20 where the electric wires 3 are passed in the wiring space portion 23 is accommodated in the accommodation space portion 11c of the grommet body 10. Moreover, in the grommet 1, the outer 30 is attached to the grommet body 10 in a positional relationship such that the tubular portion connection portion 11d of the grommet base portion 11 and the like are fitted in the fitting space portion 34. Further, in the grommet 1, as shown in FIGS. 17 and 18, the grommet base portion 11 of the grommet body 10 is attached to the accommodation recess portion 103. And in the grommet 1, the pair of fixing portions 32 and 33 are bolted to the door panel 101 in a state in which the grommet base portion 11 of the grommet body 10 and the protector 20 are sandwiched between the body portion 31 of the outer 30 and the water stopped surface 105. As a consequence, the grommet 1 is fixed to the door panel 101 in a state in which the lip portion 13 of the grommet body 10 is pressed toward the water stopped surface 105 by the outer 30. Thereby, the grommet 1 is prevented from separating from the vehicle 100 and is surely fixed to the accommodation recess portion 103 of the door panel 101.

In this case, in the grommet 1 of the present embodiment, as shown in FIGS. 13, 14 and 15, etc., a first grommet body side recess portion 11l of the grommet body 10 and a protector side protruding portion 21e of the protector 20 are fitted together, and a second grommet body side recess portion 11m of the grommet body 10 and an outer side protruding portion 36 of the protector 20 are fitted together. In this example, in the grommet 1, the grommet body 10 has the first grommet body side recess portion 11l and the second grommet body side recess portion 11m, the protector 20 has the protector side protruding portion 21e, and the outer 30 has the outer side protruding portion 36.

The first grommet body side recess portion 11l is formed, as shown in FIGS. 6, 13, 14 and 15, etc., on the side of the accommodation space portion 11c in the grommet body 10. In the present embodiment, a pair of first grommet body side recess portions 11l are formed so as to oppose the inner surface of the tubular portion connection portion 11d with respect to the first width direction in the neighborhood of the connection opening 11j. More specifically, the first grommet body side recess portion 11l is formed on the side of the grommet flat portion 11a of the inner surface of the tubular portion connection portion 11d with respect to the second width direction (see FIG. 6, etc.). The first grommet body side recess portions 11l are each substantially rectangular in cross section, and formed along the pressing direction. The first grommet body side recess portions 11l are each open to the side of the accommodation space portion 11c at the end portion on the side of the accommodation space portion 11c with respect to the pressing direction, and are each closed at the end portion on the other side (see FIG. 6, etc.). Moreover, the first grommet body side recess portions 11l are each closed at the end portion on the outside with respect to the first width direction, and are each open to the side of the connection opening 11j at the end portion on the inside (see FIG. 15, etc.). Further, the first grommet body side recess portions 11l are each closed at both sides in the second width direction (see FIG. 15, etc.). That is, the first grommet body side recess portion 11l is open at the end portion on the side of the accommodation space portion 11c with respect to the pressing direction and at the end portion on the inside with respect to the first width direction. The pair of first grommet body side recess portions 11l are provided in positions opposing each other with the connection opening 11j therebetween with respect to the first width direction (see FIG. 15, etc.).

The second grommet body side recess portion 11m is formed, as shown in FIGS. 4, 14 and 15. etc., on the outer surface of the grommet body 10 so as to be adjacent to the first grommet body side recess portion 11l. In the present embodiment, a pair of second grommet body side recess portions 11m are formed so as to oppose the outer surface of the tubular portion connection portion 11d with respect to the first width direction. More specifically, the second grommet body side recess portions 11m are each formed substantially in the center of the outer surface of the tubular portion connection portion 11d with respect to the second width direction (see FIGS. 4 and 14, etc.). The second grommet body side recess portions 11m are each provided adjacent to the side of each of the above-described first grommet body side recess portions 11l opposite to the side of the grommet flat portion 11a with respect to the second width direction. In other words, the above-described first grommet body side recess portions 11l are each provided adjacent to each second grommet body side recess portion 11m between each second grommet body side recess portion 11m and the grommet flat portion 11a with respect to the second width direction. By the first grommet body side recess portions 11l and the second grommet body side recess portions 11m being each provided adjacent to each other in the second width direction, the cross-sectional shape of the surface perpendicular to the pressing direction (see FIG. 15, etc.) is substantially hook-shaped, in other words, a cross-sectional shape where recess and protruding portions are mingled with each other. The second grommet body side recess portions 11m are each substantially rectangular in cross section, and formed along the first width direction perpendicular to the pressing direction. The second grommet body side recess portions 11 m are each open to the outside at the end portion on the outside with respect to the first width direction, and is closed at the end portion on the inside (see FIG. 15, etc.). Moreover, the second grommet body side recess portion 11m is closed at both sides in the second width direction (see FIG. 15, etc.). Further, the second grommet body side recess portion 11m is also closed at both sides in the pressing direction (see FIG. 14, etc.). That is, the second grommet body side recess portions 11m are each open only at the end portion on the outside with respect to the first width direction. The pair of second grommet body side recess portions 11m are provided in positions opposing each other with the connection opening 11j therebetween with respect to the first width direction (see FIG. 15, etc.).

The protector side protruding portion 21e is provided, as shown in FIGS. 3, 8, 9, 13, 14 and 15, etc., in a position where it is fitted in the first grommet body side recess portion 11l in the protector 20 in a state in which the protector 20 is accommodated in the accommodation space portion 11c. A pair of protector side protruding portions 21e are provided so as to correspond to the pair of first grommet body side recess portions 11l. The protector side protruding portions 21e are each formed so as to protrude from the edge portion where the insertion opening 26 is formed, along the pressing direction on the slanting wall portion 21b of the protector base portion 21. The protector side protruding portions 21e are each formed so that the outer shape thereof has a size and shape that can be fitted in the first grommet body side recess portion 11*l* and be in close contact with the inner wall surface of the first grommet body side recess portion 11*l*. The pair of protector side protruding portions 21*e* are provided in positions opposing each other with the insertion opening 26 therebetween with respect to the first width direction (see FIG. 8, etc.). The protector side protruding portions 21*e* are each formed in a position where it is fitted in the first grommet body side recess portion 11*l* in a state in which the protector 20 is inserted all the way into the accommodation space portion 11*c*.

Further, the protector 20 of the present embodiment has a positioning abutment portion 21*f*. The positioning abutment portion 21*f* is, as shown in FIGS. 8, 9 and 15, etc., a curved protruding wall surface formed so as to protrude from the edge portion of the U-shaped curved surface portion along the pressing direction on the slanting wall portion 21*b* of the protector base portion 21. As shown in FIGS. 13 and 15, the positioning abutment portion 21*f* is allowed to abut on an inner part on the side opposite to the insertion opening 25 of the accommodation space portion 11*c* in a position where each protector side protruding portion 21*e* is fitted in the first grommet body side recess portion 11*l* in a state in which the protector 20 is inserted all the way into the accommodation space portion 11*c*.

The outer side protruding portion 36 is, as shown in FIGS. 3, 10, 11, 13, 14 and 15, etc., provided in a position where it is fitted in the second grommet body side recess portion 11*m* in the outer 30 in a state in which the outer 30 fixes the grommet body 10 to the door panel 101. A pair of outer side protruding portions 36 are provided so as to correspond to the pair of second grommet body side recess portions 11*m*. The outer side protruding portions 36 are provided on the fixing portions 32 and 33 of the outer 30, respectively. The outer side protruding portions 36 are formed so as to protrude from the surfaces opposing the fitting space portion 34 toward the fitting space portion 34 along the first width direction perpendicular to the pressing direction on the fixing portions 32 and 33. The outer side protruding portions 36 are each formed so that the outer shape thereof has a size and shape that can be fitted in the second grommet body side recess portion 11*m* and be in close contact with the inner wall surface of the second grommet body side recess portion 11*m*. The pair of outer side protruding portions 36 are provided in positions opposing each other with the fitting space portion 34 therebetween with respect to the first width direction (see FIG. 11, etc.). The outer side protruding portions 36 are each formed in a position where it is fitted in the second grommet body side recess portion 11*m* in a state in which the outer 30 is attached to the grommet body 10 in a positional relationship such that the tubular portion connection portion 11*d* of the grommet base portion 11 and the like are fitted in the fitting space portion 34. Moreover, the above-described protector side protruding portions 21*e* and first grommet body side recess portions 11*l* are each situated, as shown in FIG. 15, between each outer side protruding portion 36 and the body portion 31 of the outer 30 in a state in which the grommet body 10 is fixed to the door panel 101 by the outer 30. In further other words, the protector side protruding portions 21*e* and the outer side protruding portions 36 adjacent to each other with part of the grommet body 10 interposed therebetween along the second width direction in a state in which the protector 20 is accommodated in the accommodation space portion 11*c* and the grommet body 10 is fixed to the door panel 101 by the outer 30.

Further, the outer 30 of the present embodiment has, as shown in FIGS. 10 and 14, etc., a pair of stepped portions 37 on the parts of connection between the body portion 31 and the pair of fixing portions 32 and 33. The pair of stepped portions 37 are formed as portions that press the tubular portion connection portion 11*d* toward the water stopped surface 105 between them and the water stopped surface 105 (see FIG. 18, etc.) with respect to the pressing direction in a state in which the outer 30 is attached to the grommet body 10 in a positional relationship such that the tubular portion connection portion 11*d* of the grommet base portion 11 and the like are fitted in the fitting space portion 34.

In the grommet 1, as shown in FIG. 13, etc., the electric wires 3 are laid from the side of the door 102 of the vehicle 100 to the side of the vehicle body by the electric wires 3 being passed through the insertion opening 25, wiring space portion 23 and insertion opening 26 of the protector 20 and the connection opening 11*j*, insertion space portion 12*b* and vehicle body side grommet portion 12*a* of the grommet body 10 and the like.

In the grommet 1, in a state in which it is attached and fixed to the accommodation recess portion 103 through the outer 30, as shown in FIG. 16, etc., the lip portion 13 of the grommet body 10 is placed in a pressed region 35 pressed by the outer 30. The lip portion 13 of the present embodiment is formed so that at least part thereof is placed in the pressed region 35 on the water stopping surface 11*f*. Here, the pressed region 35 pressed by the outer 30 is a region where the outer 30 presses toward the water stopped surface 105 in the pressing direction, and typically, corresponds to a region where the part including the body portion 31, fixing portions 32 and 33 and fitting space portion 34 of the outer 30 is projected on the water stopping surface 11*f* along the pressing direction.

Here, as shown in FIGS. 16, 17, etc., in a state in which the grommet 1 is attached and fixed to the accommodation recess portion 103 of the door panel 101, the weather strip 104 is in close contact with and laminated on the flat surface 11*e* of the grommet base portion 11 across the grommet base portion 11 of the grommet body 10 along the first width direction. The entire part of the outside lip portion 13*a* of the lip portion 13 of the present embodiment is placed in the pressed region 35. Specifically, the outside lip portion 13*a* is placed in a region between the pair of fixing portions 32 and 33 of the outer 30 with respect to the first width direction in the pressed region 35. In other words, the pair of fixing portions 32 and 33 of the outer 30 are situated outside the outside lip portion 13*a* of the lip portion 13 with respect to the first width direction in a state in which the grommet body 10 is fixed to the door panel 101. On the other hand, at least part (in this example, the bent portion side in the center) of the inside lip portion 13*b* of the lip portion 13 is placed in the pressed region 35 and another part (in this example, the end portion side) is placed in a placement region 104*a* of the weather strip 104. Here, the placement region 104*a* of the weather strip 104 typically corresponds to a region where the weather strip 104 provided on the hinge side end surface 101*a* of the door panel 101 is projected to the water stopping surface 11*f* along the pressing direction.

Moreover, in the grommet 1, in a state in which it is attached and fixed to the accommodation recess portion 103 of the door panel 101 through the outer 30, as shown in FIG. 18, etc., the protector 20 where the electric wires 3 are passed constitutes a rigid body portion. That is, the protector 20 as the rigid body portion is formed of a rigid body having rigidity higher than that of the lip portion 13 of the grommet body 10, and is interposed between the outer 30 and the lip portion 13 with respect to the pressing direction of the outer 30. The protector 20 is interposed between the outer 30 and the lip portion 13 with respect to the pressing direction in a state in which the grommet 1 is attached and fixed to the accommodation recess portion 103 through the outer 30, and forms a layer structure together with the grommet body 10. More specifically, in the protector 20, at least the protector cover portion 22 and a part of the protector base portion 21, in this example, the end portion on the side of the insertion opening 26 are interposed between the body portion 31 of the outer 30 and the lip portion 13 with respect to the pressing direction, and form the layer structure together with the grommet body 10. That is, in the grommet 1, the grommet flat portion 11a (the flat surface 11e) of the grommet base portion 11, the protector cover portion 22 (the flat surface 22a) of the protector 20, the wiring space portion 23, the protector base portion 21 (the base surface 21a) of the protector 20, the grommet bulging portion 11b (the water stopping surface 11f) of the grommet base portion 11 and the lip portion 13 form the layer structure in this order between the body portion 31 of the outer 30 and the water stopped surface 105 with respect to the pressing direction. Thereby, in the grommet 1, the protector 20 functions as a pressing force transmitting portion that transmits the pressing force from the outer 30 to the lip portion 13 or a pressing portion that presses the lip portion 13.

In the grommet 1 structured as described above, in a state in which it is attached and fixed to the accommodation recess portion 103 of the door panel 101 through the outer 30, the outer 30 presses the lip portion 13 of the grommet body 10 toward the water stopped surface 105, whereby the lip portion 13 is pressed against the water stopped surface 105 to be deformed elastically. More specifically, the outside lip portion 13a is elastically deformed and comes into close contact by being pressed toward the water stopped surface 105 through the protector 20 by the outer 30, and the inside lip portion 13b is elastically deformed and comes into close contact by being pressed toward the water stopped surface 105 through the protector 20 by the outer 30 and the weather strip 104. As a consequence, in the grommet 1, the lip portion 13 stops water between the water stopping surface 11f and the water stopped surface 105, so that water intrusion from the vehicle exterior space side to the vehicle interior space side of the grommet 1 can be suppressed.

According to the grommet 1 described above, the grommet body 10, the outer 30 and the protector 20 as the rigid body portion are provided, and at least a part of the lip portion 13 is placed in the pressed region 35 pressed by the outer 30.

According to the wire harness 2 described above, the electric wires 3 where the connectors 4 are provided on the end portions and the above-described grommet 1 are provided, and at least a part of the lip portion 13 is placed in the pressed region 35 pressed by the outer 30.

Therefore, in the grommet 1 and the wire harness 2, for example, since the pressing force can be substantially uniformly applied to the lip portion 13 in a comparatively wide area by the lip portion 13 being placed in the pressed region 35 pressed by the outer 30, water can be surely stopped between the water stopping surface 11f and the water stopped surface 105 by the lip portion 13 pressed against the water stopped surface 105, so that water stopping performance can be improved.

Moreover, in this case, in the grommet 1 and the wire harness 2, since the lip portion 13 is hollow and elastically deformed with ease, for example, compared with a lip portion that is dense inside, the lip portion 13 can be crushed so as to be in contact with the water stopped surface 105 with a smaller pressing force. As a consequence, in the grommet 1 and the wire harness 2, since the reaction force that the outer 30 receives from the lip portion 13 can be suppressed to a relatively small one when the lip portion 13 is pressed, for example, even when the outer 30 is formed of a resin material having rigidity lower than that of metal, strength sufficient for receiving the reaction force can be ensured. That is, in the grommet 1 and the wire harness 2, since the outer 30 can be formed of a resin material having relatively low rigidity, for example, weight increase can be suppressed, and even when the outer 30 differs among vehicle models, manufacture is easy.

More specifically, according to the grommet 1 and the wire harness 2 described above, the outer 30 has the fixing portions 32 and 33 provided as a pair so as to sandwich the grommet body 10 with respect to the first width direction perpendicular to the pressing direction and is fixed to the door panel 101 through the pair of fixing portions 32 and 33, and the lip portion 13 is placed in an area within the pressed region 35 and between the pair of fixing portions 32 and 33 with respect to the first width direction. Therefore, in the grommet 1 and the wire harness 2, since a part of the lip portion 13 is placed in the area between the pair of fixing portions 32 and 33 where the force of pressing by the outer 30 tends to be comparatively large, a larger pressing force can be appropriately applied to the lip portion 13, so that water stopping performance can be further improved.

Further, according to the grommet 1 and the wire harness 2 described above, the grommet body 10 has the grommet base portion 11 attachable to the accommodation recess portion 103 where the electric wires 3 are passed and that is formed on the door panel 101, and the lip portion 13 has the outside lip portion 13a and the inside lip portion 13b. The outside lip portion 13a is formed so as to protrude from the water stopping surface 11f, and the entire part thereof is placed in the pressed region 35. The inside lip portion 13b is formed so as to protrude from the water stopping surface 11f, and at least part thereof is placed in the pressed region 35 and another part thereof is placed in the placement region 104a of the weather strip 104. Therefore, in the grommet 1 and the wire harness 2, the outside lip portion 13a can be surely pressed toward the water stopped surface 105 by the outer 30 so as to be elastically deformed and in close contact, and the inside lip portion 13b can be surely pressed toward the water stopped surface 105 by the outer 30 and the weather strip 104 so as to be elastically deformed and in close contact. As a consequence, in the grommet 1 and the wire harness 2, water can be surely stopped between the water stopping surface 11f and the water stopped surface 105 by the outside lip portion 13a and the inside lip portion 13b.

Further, according to the grommet 1 and the wire harness 2 described above, the protector 20 is provided so as to be formed of a rigid body having rigidity higher than that of the grommet body 10 as described above, is accommodated in the accommodation space portion 11c formed in the grommet body 10 in a state in which the electric wires 3 are passed, and constitutes a rigid body portion, and the protector 20 is interposed between the outer 30 and the lip portion 13 with respect to the pressing direction and forms a layer structure together with the grommet body 10. Therefore, in the grommet 1 and the wire harness 2, the pressing force from the outer 30 is transmitted to the lip portion 13 through the grommet body 10 and the protector 20 as the rigid body portion, more specifically, through the grommet flat portion 11a, the protector cover portion 22, the protector base portion 21 and the grommet bulging portion 11b in this order, so that the lip portion 13 can be pressed toward the water stopped surface 105. As a consequence, in the grommet 1 and the wire harness 2, since the pressing force from the outer 30 can be more uniformly transmitted to the lip portion 13, the water stopping performance in the entire part of the lip portion 13 can be made substantially uniform, so that water stopping performance can be improved also in this regard.

According to the grommet 1 described above, the grommet body 10, the protector 20 and the outer 30 are provided, the grommet body 10 has the first grommet body side recess portion 11l formed on the side of the accommodation space portion 11c and the second grommet body side recess portion 11m formed on the outer surface so as to be adjacent to the first grommet body side recess portion 11l, the protector 20 has the protector side protruding portion 21e fitted in the first grommet body side recess portion 11l in a state in which the protector 20 is accommodated in the accommodation space portion 11c, and the outer 30 has the outer side protruding portion 36 fitted in the second grommet body side recess portion 11m in a state in which the grommet body 10 is fixed to the door panel 101.

According to the wire harness 2 described above, the electric wires 3 where the connectors 4 are provided on end portions and the above-described grommet 1 are provided, the grommet body 10 has the first grommet body side recess portion 11l formed on the side of the accommodation space portion 11c and the second grommet body side recess portion 11m formed on the outer surface so as to be adjacent to the first grommet body side recess portion 11l, the protector 20 has the protector side protruding portion 21e fitted in the first grommet body side recess portion 11l in a state in which the protector 20 is accommodated in the accommodation space portion 11c, and the outer 30 has the outer side protruding portion 36 fitted in the second grommet body side recess portion 11m in a state in which the grommet body 10 is fixed to the door panel 101.

Therefore, in the grommet 1 and the wire harness 2, the protector side protruding portion 21e of the protector 20 is fitted in the first grommet body side recess portion 11l of the grommet body 10 from the side of the accommodation space portion 11c, and the outer side protruding portion 36 of the outer 30 is fitted in the second grommet body side recess portion 11m of the grommet body 10 from the outer surface side. And in the grommet 1 and the wire harness 2, since the fitting parts are provided adjacent to each other, the rigidity of the part, where the outer 30 is attached, of the grommet body 10 as an elastic body can be ensured by these fitting parts. As a consequence, in the grommet 1 and the wire harness 2, the position of the grommet body 10 can be prevented by the outer 30 from being shifted with respect to the first width direction and the second width direction while the outer 30 is surely attached to the grommet body 10, so that the grommet body 10 can be surely fixed to the door panel 101. That is, in the grommet 1 and the wire harness 2, the protector side protruding portion 21e and the outer side protruding portion 36 are fitted together in a positional relationship such that the wall surface on the border between the first grommet body side recess portion 11l and the second grommet body side recess portion 11m of the grommet body 10 as an elastic body is sandwiched by the rigid bodies. As a consequence, in the grommet 1 and the wire harness 2, since the rigidity of the fitting parts can be ensured at the grommet body 10 as an elastic body, the grommet body 10 can be positioned on the door panel 101 and fixed after firmly pressed down toward the water stopped surface 105 by the outer 30. Moreover, in the grommet 1 and the wire harness 2, since a part (the tubular portion connection portion 11d of the grommet base portion 11, etc.) of the grommet body 10 can be pressed toward the water stopped surface 105 by the pair of stepped portions 37 of the outer 30, the grommet body 10 can be securely positioned on the door panel 101 and fixed also in this regard.

More specifically, according to the grommet 1 and the wire harness 2 described above, the protector side protruding portion 21e is formed along the pressing direction of the outer 30, the outer side protruding portion 36 is formed along the first width direction perpendicular to the pressing direction, and the protector side protruding portion 21e and the outer side protruding portion 36 adjacent to each other with a part of the grommet body 10 interposed therebetween along the pressing direction and the second width direction perpendicular to the first width direction in a state in which the protector 20 is accommodated in the accommodation space portion 11c and the grommet body 10 is fixed to the door panel 101 by the outer 30. Therefore, in the grommet 1 and the wire harness 2, a structure can be easily realized in which the protector side protruding portion 21e and the outer side protruding portion 36 are fitted together in a positional relationship such that the wall surface on the border between the first grommet body side recess portion 11l and the second grommet body side recess portion 11m of the grommet body 10 as an elastic body is sandwiched by the rigid bodies. In other words, in the grommet 1 and the wire harness 2, a structure can be easily realized in which the protector side protruding portion 21e and the outer side protruding portion 36 are arranged along the second width direction and the wall surface on the border between the first grommet body side recess portion 11l and the second grommet body side recess portion 11m is sandwiched therebetween.

Further, according to the grommet 1 and the wire harness 2 described above, the outer 30 has the body portion 31 formed along the first width direction perpendicular to the pressing direction and sandwiching the grommet body 10 and the protector 20 between it and the water stopped surface 105 and the fixing portions 32 and 33 provided as a pair so as to sandwich the grommet body 10 with respect to the first width direction and provided on both end portions of the body portion 31 with respect to the first width direction, the outer side protruding portion 36 is provided on each of the fixing portions 32 and 33, and the protector side protruding portion 21e and the first grommet body side recess portion 11l are situated between the outer side protruding portion 36 and the body portion 31 in a state in which the grommet body 10 is fixed to the door panel 101 by the outer 30. Therefore, in the grommet 1 and the wire harness 2, the protector side protruding portions 21e and the first grommet body side recess portions 11l are situated between the outer side protruding portions 36 and the body portion 31 in a state in which the grommet body 10 is fixed to the door panel 101 by the outer 30. In other words, in the grommet 1 and the wire harness 2, the outer 30 can be attached to the grommet body 10 in such a way that the part of the grommet body 10 where the protector side protruding portion 21e is fitted is surrounded by the body portion 31 and the outer side protruding portion 36 of the outer 30. As a consequence, in the grommet 1 and the wire harness 2, the grommet body 10 can be positioned on the door panel 101 and fixed after surely positioned with respect to the outer 30.

Further, according to the grommet 1 and the wire harness 2 described above, the grommet body 10 has the insertion opening 11i through which the protector 20 is insertable into the accommodation space portion 11c from one side, and the protector 20 has the positioning abutment portion 21f that is allowed to abut on the inner part on the side opposite to the insertion opening 25 of the grommet base portion 11c in a position where the protector side protruding portion 21e is fitted in the first grommet body side recess portion 11l. Therefore, in the grommet 1 and the wire harness 2, by inserting the protector 20 up to the position where the positioning abutment portion 21f abuts on the inner part of the accommodation space portion 11c when the protector 20 is inserted into the accommodation space portion 11c, the protector side protruding portion 21e which is difficult to view since it is situated on the side of the accommodation space portion 11c can be surely fitted in the first grommet body side recess portion 11l. As a consequence, in the grommet 1 and the wire harness 2, fitting of the protector side protruding portion 21e into the first grommet body side recess portion 11l can be facilitated, so that the assembly workability when the protector 20 is assembled to the grommet body 10 can be improved.

According to the grommet 1 described above, the grommet body 10, the outer 30 and the protector 20 as the rigid body portion are provided, and the outer 30 has the fixing portions 32 and 33 provided as a pair so as to sandwich the grommet body 10 with respect to the first width direction perpendicular to the pressing direction and is fixed to the door panel 101 through the pair of fixing portions 32 and 33.

According to the wire harness 2 described above, the electric wires 3 where the connectors 4 are provided on the end portions and the above-described grommet 1 are provided, and the outer 30 has the fixing portions 32 and 33 provided as a pair so as to sandwich the grommet body 10 with respect to the first width direction perpendicular to the pressing direction and is fixed to the door panel 101 through the pair of fixing portions 32 and 33.

Therefore, in the grommet 1 and the wire harness 2, the outer 30 has the fixing portions 32 and 33 provided as a pair so as to sandwich the grommet body 10 with respect to the width direction and is fixed to the door panel 101 through the pair of fixing portions 32 and 33 in a state in which the grommet body 10 is sandwiched between the outer 30 and the water stopped surface 105. That is, in the grommet 1 and the wire harness 2, with respect to the direction (the first width direction, the second width direction) perpendicular to the pressing direction, the fixing portions 32 and 33 never lap over, that is, interfere with the grommet body 10 and the protector 20. In other words, in the grommet 1 and the wire harness 2, the fixing portions 32 and 33 are situated outside the contours of the grommet base portion 11 and the protector 20 in order not to lap over the grommet base portion 11 of the grommet body 10 and the protector 20 with respect to the direction perpendicular to the pressing direction. And in the grommet 1 and the wire harness 2, the grommet body 10 and the protector 20 can be fixed to the door panel 101 through the fixing portions 32 and 33 disposed in the positions as mentioned above in a state in which the grommet base portion 11 and the protector 20 are sandwiched between the body portion 31 of the outer 30 and the water stopped surface 105. Thereby, in the grommet 1 and the wire harness 2, for example, even when the configuration (for example, dimensions in the width and height directions) of the neighborhood of the grommet attachment position on the side of the door panel 101 differs among vehicle models or the like, by changing the configurations of the fixing portions 32 and 33 of the outer 30 or the like structured separately from the grommet body 10, the grommet body 10 can be appropriately fixed to the door panel 101 without the overall configuration of the grommet 1 being changed. As a consequence, in the grommet 1 and the wire harness 2, versatility can be improved. That is, in the grommet 1 and the wire harness 2, for example, it is possible to make the structures of the grommet body 10 and the protector 20 common to different vehicle models while designing the outer 30 for each vehicle model. Moreover, in this case, in the grommet 1 and the wire harness 2, since the outer 30 is structured separately from the grommet body 10, the protector 20 and the like, the degree of freedom of the positions where the fixing portions 32 and 33 are provided can be improved, and the positions can be comparatively freely set according to the shape of the side of the door panel 101.

Moreover, in the grommet 1 and the wire harness 2, since the fixing portions 32 and 33 for bolting are placed on both sides of the grommet body 10, for example, the fixing portions 32 and 33 can be prevented from being hidden by the grommet body 10 and the like when the outer 30 is fixed, so that bolting can be performed while the fixing portions 32 and 33 are viewed. As a consequence, in the grommet 1 and the wire harness 2, the workability at the time of electric wire laying can be improved. Moreover, in the grommet 1 and the wire harness 2, since the fixing portions 32 and 33 are fixed by the fastening bolts 32b and 33b, for example, compared with a case where a clamp structure is used for the fixing portions 32 and 33, detachment from the door panel 101 is easy, and re-attachment to the door panel 101 is also easy. As a consequence, in the grommet 1 and the wire harness 2, maintainability and serviceability of the vehicle 100 can also be improved.

Further, according to the grommet 1 and the wire harness 2 described above, the pair of fixing portions 32 and 33 are situated outside the lip portion 13 with respect to the first width direction in a state in which the grommet body 10 is fixed to the door panel 101 by the outer 30. Therefore, in the grommet 1 and the wire harness 2, the area which is positioned inside (between) the pair of fixing portions 32 and 33 with respect to the first width direction and which requires water stopping can be limited and made relatively small. Thereby, in the grommet 1 and the wire harness 2, the overall length of the lip portion 13 (the outside lip portion 13a, the inside lip portion 13b) situated inside the pair of fixing portions 32 and 33 can be made relatively small. As a consequence, in the grommet 1 and the wire harness 2, the outer shapes of the grommet base portion 11 of the grommet body 10 and the protector 20 can be made relatively small, so that the size of the grommet 1 can be reduced.

Further, according to the grommet 1 and the wire harness 2 described above, at least a part of the lip portion 13 is placed in an area within the pressed region 35 pressed by the outer 30 and between the pair of fixing portions 32 and 33 with respect to the first width direction. Therefore, in the grommet 1 and the wire harness 2, since the pressing force can be substantially uniformly applied to the lip portion 13 in a comparatively wide area by the lip portion 13 being placed in the pressed region 35 pressed by the outer 30, water can be surely stopped between the water stopping surface 11f and the water stopped surface 105 by the lip portion 13 pressed against the water stopped surface 105, so that water stopping performance can be improved. More specifically, in the grommet 1 and the wire harness 2, since a part of the lip portion 13 is placed in the area between the pair of fixing portions 32 and 33 where the force of pressing by the outer 30 tends to be comparatively high, a larger pressing force can be appropriately applied to the lip portion 13, so that water stopping performance can be further improved.

Moreover, in this case, in the grommet 1 and the wire harness 2, since the lip portion 13 is hollow and elastically deformed with ease, for example, compared with a lip portion that is dense inside, the lip portion 13 can be crushed so as to be in contact with the water stopped surface 105 with a smaller pressing force. As a consequence, in the grommet 1 and the wire harness 2, since the reaction force that the outer 30 receives from the lip portion 13 can be suppressed to a relatively small one when the lip portion 13 is pressed, for example, even when the outer 30 is formed of a resin material having rigidity lower than that of metal, strength sufficient for receiving the reaction force can be ensured. That is, in the grommet 1 and the wire harness 2, since the outer 30 can be formed of a resin material has relatively low rigidity, for example, weight increase can be suppressed, and even when the outer 30 differs among vehicle models, manufacture is easy.

According to the grommet 1 described above, the grommet body 10, the protector 20 and the outer 30 are provided, and the protector 20 has the protector base portion 21 that forms the base surface 21a of a shape along the water stopped surface 105 and the protector cover portion 22 that forms the wiring space portion 23 where the electric wires 3 are passed between it and the protector base portion 21 and forms the flat surface 22a where the weather strip 104 provided on the door panel 101 across the grommet body 10 is placed with the grommet body 10 being interposed.

According to the wire harness 2 described above, the electric wires 3 where the connectors 4 are provided on the end portions and the above-described grommet 1 are provided, and the protector 20 has the protector base portion 21 that forms the base surface 21a of a shape along the water stopped surface 105 and the protector cover portion 22 that forms the wiring space portion 23 where the electric wires 3 are passed between it and the protector base portion 21 and forms the flat surface 22a where the weather strip 104 provided on the door panel 101 across the grommet body 10 is placed with the grommet body 10 being interposed.

Therefore, in the grommet 1 and the wire harness 2, for example, by pressing the lip portion 13 toward the water stopped surface 105 by transmitting the pressing force from the outer 30 to the lip portion 13 through the base surface 21a of the protector base portion 21 while the electric wires 3 are protected by the protector 20 accommodated in the grommet body 10, water can be appropriately stopped at the gap with the water stopped surface 105. Further, in the grommet 1 and the wire harness 2, since the surface where the weather strip 104 provided on the door panel 101 and the grommet body 10 abut on each other can be made flat by the flat surface 22a of the protector cover portion 22, water can be appropriately stopped at the gap with the weather strip 104. As a consequence, the grommet 1 and the wire harness 2 can appropriately deliver water stopping performance. That is, in the grommet 1 and the wire harness 2, by situating the base surface 21a of the protector base portion 21 as a rigid body inside the water stopping surface 11f of the grommet base portion 11 as an elastic body, the shape of the water stopping surface 11f can be made a shape along the water stopped surface 105 by the base surface 21a of a shape along the water stopped surface 105. Moreover, in the grommet 1 and the wire harness 2, by situating the flat surface 22a of the protector cover portion 22 as a rigid body inside the flat surface 11e of the grommet base portion 11 as an elastic body, the flat surface 11e of the grommet base portion 11 can be made flat by the flat surface 22a. As a consequence, in the grommet 1 and the wire harness 2, the water stopping surface 11f together with the lip portion 13 can be surely pressed toward the water stopped surface 105, and the surface where the weather strip 104 and the grommet body 10 abut on each other can be made flat so that the weather strip 104 is surely in close contact with the flat surface 11e of the grommet body 10, so that water stopping performance can be appropriately delivered.

More specifically, according to the grommet 1 and the wire harness 2 described above, the protector 20 in which at least the protector cover portion 22 and a part of the protector base portion 21 are interposed between the outer 30 and the lip portion 13 with respect to the pressing direction of the outer 30 forms a layer structure together with the grommet body 10. In this example, in the grommet 1 and the wire harness 2, the protector cover portion 22 and the end portion of the protector base portion 21 on the side of the insertion opening 26 are interposed between the outer 30 and the lip portion 13, and the protector cover portion 22 and the end portion of the protector base portion 21 on the side of the insertion opening 26 are pressed toward the water stopped surface 105 by the outer 30.

Therefore, in the grommet 1 and the wire harness 2, even in a state in which the electric wires 3 are passed in the wiring space portion 23, by the outer 30 pressing the protector cover portion 22 and the end portion of the protector base portion 21, the protector cover portion 22 can be prevented from being lifted from the protector base portion 21. Thereby, in the grommet 1 and the wire harness 2, the flat surface 22a of the protector cover portion 22, and thus the flat surface 11e of the grommet base portion 11 can be surely maintained flat, so that water can be more surely stopped at the gap with the weather strip 104. As a consequence, in the grommet 1 and the wire harness 2, water stopping performance can be improved. Further, in the grommet 1 and the wire harness 2, the pressing force from the outer 30 is transmitted to the protector base portion 21 through the grommet body 10 and the protector cover portion 22, so that the lip portion 13 can be pressed by the base surface 21a of the protector base portion 21. Thereby, in the grommet 1 and the wire harness 2, the pressing force from the outer 30 can be more uniformly transmitted to the lip portion 13, so that the water stopping performance in the entire part of the lip portion 13 can be made substantially uniform. In the grommet 1 and the wire harness 2, water stopping performance can be improved also in this regard.

Further, according to the grommet 1 and the wire harness 2 described above, the protector 20 has the reinforcing wall portion 27 interposed between the protector base portion 21 and the protector cover portion 22 with respect to the pressing direction of the outer 30. Therefore, in the grommet 1 and the wire harness 2, since the protector 20 is reinforced with respect to the pressing direction by the reinforcing wall portion 27 and strength can be ensured, when a pressing force acts on the protector 20 from the outer 30, the protector 20 can be made difficult to collapse.

Further, according to the grommet 1 and the wire harness 2 described above, the reinforcing wall portion 27 includes the pair of base portion side wall portions 27a provided on the protector base portion 21 and opposing each other with an interval therebetween with respect to the first width direction perpendicular to the pressing direction and the pair of cover portion side wall portions 27b provided on the protector cover portion 22 and opposing each other with an interval therebetween with respect to the width direction, the pair of base portion side wall portions 27a and the pair of cover portion side wall portions 27b are arranged such that the base portion side wall portions 27a contact the respective cover portion side wall portions 27b, respectively. Therefore, in the grommet 1 and the wire harness 2, when the pressing force acts on the protector 20 from the outer 30, since the protector 20 can be prevented from being collapsed to be deformed along the first width direction by the base portion side wall portions 27a and the cover portion side wall portions 27b contact each other, respectively, the protector 20 can be made more difficult to collapse.

The grommet and the wire harness according to the above-described embodiment of the present invention are not limited to the above-described embodiment, and may be modified variously within the scope of the claims.

While the lip portion 13 includes the outside lip portion 13a as the first lip portion and the inside lip portion 13b as the second lip portion in the description given above, the present invention is not limited thereto. The lip portion 13 may have a structure not having either one of the outside lip portion 13a and the inside lip portion 13b, or may have a structure having a third lip portion. The configurations of the outside lip portion 13a and the inside lip portion 13b are not limited to the above-described ones. For example, the outside lip portion 13a may be inclined with respect to the first width direction within the range of the pressed region 35 pressed by the outer 30. In this case, as illustrated by the chain double-dashed lines in FIG. 16, the outside lip portion 13a' is formed so as to be inclined from the vehicle interior space side toward the vehicle exterior space side from the upper side toward the lower side in the vertical direction (first width direction) within the range of the pressed region 35. By providing this structure, the outside lip portion 13a' can guide water drops trying to enter from the vehicle exterior space side, from the vehicle interior space side to the vehicle exterior space side. The inside lip portion 13b may be formed, for example, so as to extend from the edge portion on one side to the edge portion on the other side of the water stopping surface 11f in the first width direction while a central portion in the first width direction is bent so as to protrude toward the side opposite to the outside lip portion 13a. In this case, the inside lip portion 13b may be placed, for example, so that the bent portion side in the center is situated within the placement region 104a of the weather strip 104 and that the edge portion side is situated within the pressed region 35. Moreover, it is unnecessary that the entire part of the outside lip portion 13a be situated within the range of the pressed region 35.

While the protector 20 constitutes a rigid body portion in the above description, the present invention is not limited thereto. The grommet 1 may have a structure in which the protector 20 is not provided and instead of this, two-color molding is applied by a high rigidity material to a predetermined part of the grommet base portion 11 of the grommet body 10, that is, to a part interposed between the outer 30 and the lip portion 13 and the part having undergone the two-color molding constitutes the rigid body portion.

While the outer 30 is formed of a synthetic resin material in the above description, the present invention is not limited thereto; for example, it may be formed of a metal.

While the outer 30 is bolted at the fixing portions 32 and 33 in the above description, the present invention is not limited thereto; for example, it may be fixed to the door panel 101 by clamping at the fixing portions 32 and 33.

Moreover, the connection portions of the wire harness are the connectors 4 in the above description, the present invention is not limited thereto; they may be terminals or the like provided on the end portions of the electronic wires by crimping, welding or the like.

What is claimed is:

1. A grommet comprising:
a grommet body formed of an elastic body and comprising a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface;
an outer which presses the lip portion toward the water stopped surface and which fixes the grommet body to the attachment panel in a state in which the grommet body is sandwiched between the outer and the water stopped surface; and
a rigid body portion which is formed of a rigid body having rigidity higher than that of the lip portion, and which is interposed between the outer and the lip portion with respect to a pressing direction of the outer defined by the direction along the pressing by the outer,
wherein at least a part of the lip portion is placed in a pressed region pressed by the outer.

2. The grommet according to claim 1,
wherein the outer comprises a pair of fixing portions which sandwich the grommet body with respect to a width direction perpendicular to the pressing direction, and the outer is fixed to the attachment panel through the pair of fixing portions, and
wherein the lip portion is placed in an area within the pressed region and between the pair of fixing portions with respect to the width direction.

3. The grommet according to claim 1, further comprising:
a protector which is formed of a rigid body having rigidity higher than that of the grommet body, which is accommodated in an accommodation space portion formed in the grommet body in a state in which the electric wire is passed, and which constitutes the rigid body portion,
wherein the protector is interposed between the outer and the lip portion with respect to the pressing direction, and forms a layer structure together with the grommet body.

4. The grommet according to claim 1,
wherein the grommet body comprises a grommet base portion attachable to the accommodation recess portion in which the electric wire is passed and which is formed on the attachment panel, and
wherein the lip portion comprises:
a first lip portion which is formed to protrude from a water stopping surface of the grommet base portion which opposes the water stopped surface in a state in which the grommet base portion is attached to the accommodation recess portion, wherein an entire part of the first lip portion is placed in the pressed region; and
a second lip portion formed to protrude from the water stopping surface, wherein at least a part of the second lip portion is placed in the pressed region and another part of the second lip portion is placed in a placement region of a weather strip provided on the attachment panel across the grommet body.

5. The grommet according to claim 1,
wherein the rigid body portion comprises a protector which is formed of a rigid body having rigidity higher than that of the grommet body and which is accommodated in an accommodation space portion formed in the grommet body in a state in which the electric wire is passed, wherein the outer presses the lip portion toward the water stopped surface and fixes the grommet body to the attachment panel in a state in which the grommet body and the protector are sandwiched between the outer and the water stopped surface, wherein the grommet body comprises:
- a first grommet body side recess portion formed on a side of the accommodation space portion; and
- a second grommet body side recess portion formed on an outer surface of the grommet body so as to be adjacent to the first grommet body side recess portion, wherein the protector comprises a protector side protruding portion fitted in the first grommet body side recess portion in a state in which the protector is accommodated in the accommodation space portion, and wherein the outer comprises an outer side protruding portion fitted in the second grommet body side recess portion in a state in which the grommet body is fixed to the attachment panel.

6. The grommet according to claim 5,
wherein the protector side protruding portion is formed along the pressing direction of the outer,
wherein the outer side protruding portion is formed along the width direction perpendicular to the pressing direction, and
wherein the protector side protruding portion and the outer side protruding portion are adjacent to each other with a part of the grommet body interposed therebetween along the pressing direction and a direction perpendicular to the width direction in a state in which the protector is accommodated in the accommodation space portion and the grommet body is fixed to the attachment panel by the outer.

7. The grommet according to claim 5,
wherein the outer comprises:
- a body portion which is formed along the width direction perpendicular to the pressing direction and which sandwiches the grommet body and the protector between the outer and the water stopped surface; and
- a pair of fixing portions which sandwich the grommet body with respect to the width direction and which are provided on both end portions of the body portion with respect to the width direction, wherein the outer side protruding portion is provided on the fixing portion, and
wherein the protector side protruding portion and the first grommet body side recess portion are situated between the outer side protruding portion and the body portion in a state in which the grommet body is fixed to the attachment panel by the outer.

8. The grommet according to claim 5,
wherein the grommet body has an insertion opening which allows the protector to be inserted into the accommodation space portion from one side, and
wherein the protector comprises a positioning abutment portion which is allowed to abut on an inner part of the accommodation space portion on a side opposite to the insertion opening in a position where the protector side protruding portion is fitted in the first grommet body side recess portion.

9. The grommet according to claim 1,
wherein the outer is structured separately from the grommet body, and
wherein the outer comprises a pair of fixing portions which sandwich the grommet body with respect to the width direction perpendicular to the pressing direction, and the outer is fixed to the attachment panel through the pair of fixing portions.

10. The grommet according to claim 9,
wherein the pair of fixing portions are situated outside the lip portion with respect to the width direction in a state in which the grommet body is fixed to the attachment panel by the outer.

11. The grommet according to claim 9,
wherein at least a part of the lip portion is placed in an area within the pressed region pressed by the outer and between the pair of fixing portions with respect to the width direction.

12. The grommet according to claim 1,
wherein the rigid body portion comprises a protector which is formed of a rigid body having rigidity higher than that of the grommet body and which is accommodated in the accommodation space portion formed inside the grommet body in a state in which the electric wire is passed, wherein the outer presses the lip portion toward the water stopped surface and fixes the grommet body to the attachment panel in a state in which the grommet body and the protector are sandwiched between the outer and the water stopped surface, and wherein the protector comprises:
- a protector base portion which forms a base surface of a shape along the water stopped surface; and
- a protector cover portion which forms a wiring space portion in which the electric wire is passed between the protector cover portion and the protector base portion, and which forms a flat surface on which the weather strip provided on the attachment panel across the grommet body is placed with the grommet body being interposed.

13. The grommet according to claim 12,
wherein at least the protector cover portion and a part of the protector base portion are interposed between the outer and the lip portion with respect to the pressing direction of the outer such that the protector forms a layer structure together with the grommet body.

14. The grommet according to claim 12,
wherein the protector comprises a reinforcing wall portion interposed between the protector base portion and the protector cover portion with respect to the pressing direction of the outer.

15. The grommet according to claim 14,
wherein the reinforcing wall portion comprises:
- a pair of base portion side wall portions which are provided on the protector base portion and which oppose each other with an interval therebetween with respect to the width direction perpendicular to the pressing direction; and
- a pair of cover portion side wall portions which are provided on the protector cover portion and which oppose each other with an interval therebetween with respect to the width direction, and wherein the base portion side wall portions contact the respective cover portion side wall portions.

16. A wire harness comprising:
an electric wire comprising a connection portion is provided on an end portion of the electric wire; and a grommet comprising:
- a grommet body formed of an elastic body and comprising a lip portion, wherein in a state in which an electric wire of a wire harness is passed inside the grommet body and the grommet body is attached to an accommodation recess portion formed on an attachment panel, the lip portion contacts a water stopped surface defining the accommodation recess portion to stop water between the grommet body and the water stopped surface;
- an outer which presses the lip portion toward the water stopped surface and which fixes the grommet body to the attachment panel in a state in which the grommet body is sandwiched between the outer and the water stopped surface; and
- a rigid body portion which is formed of a rigid body having rigidity higher than that of the lip portion, and which is interposed between the outer and the lip portion with respect to a pressing direction of the outer defined by the direction along the pressing by the outer, wherein at least a part of the lip portion is placed in a pressed region pressed by the outer.

17. The wire harness according to claim 16,
wherein the rigid body portion comprises a protector which is formed of a rigid body having rigidity higher than that of the grommet body and which is accommodated in an accommodation space portion formed in the grommet body in a state in which the electric wire is passed, wherein the outer presses the lip portion toward the water stopped surface and fixes the grommet body to the attachment panel in a state in which the grommet body and the protector are sandwiched between the outer and the water stopped surface, wherein the grommet body comprises:
- a first grommet body side recess portion formed on a side of the accommodation space portion; and
- a second grommet body side recess portion formed on an outer surface of the grommet body so as to be adjacent to the first grommet body side recess portion, wherein the protector comprises a protector side protruding portion fitted in the first grommet body side recess portion in a state in which the protector is accommodated in the accommodation space portion, and wherein the outer comprises an outer side protruding portion fitted in the second grommet body side recess portion in a state in which the grommet body is fixed to the attachment panel.

18. The wire harness according to claim 16,
wherein the outer is structured separately from the grommet body, and wherein the outer comprises a pair of fixing portions which sandwich the grommet body with respect to the width direction perpendicular to the pressing direction, and the outer is fixed to the attachment panel through the pair of fixing portions.

19. The wire harness according to claim 16,
wherein the rigid body portion comprises a protector which is formed of a rigid body having rigidity higher than that of the grommet body and which is accommodated in the accommodation space portion formed inside the grommet body in a state in which the electric wire is passed, wherein the outer presses the lip portion toward the water stopped surface and fixes the grommet body to the attachment panel in a state in which the grommet body and the protector are sandwiched between the outer and the water stopped surface, and wherein the protector comprises:
- a protector base portion which forms a base surface opposing the water stopped surface and having a shape along the water stopped surface; and
- a protector cover portion which forms a wiring space portion in which the electric wire is passed between the protector cover portion and the protector base portion, and which forms a flat surface on which the weather strip provided on the attachment panel across the grommet body is placed with the grommet body being interposed.

* * * * *